(12) United States Patent
Adelson et al.

(10) Patent No.: US 12,135,254 B2
(45) Date of Patent: *Nov. 5, 2024

(54) FLEXIBLE OPTICAL TACTILE SENSOR

(71) Applicant: Massachusetts Institute of Technology, Cambridge, MA (US)

(72) Inventors: Edward Adelson, Winchester, MA (US); Sandra Liu, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 242 days.

This patent is subject to a terminal disclaimer.

(21) Appl. No.: 17/665,186

(22) Filed: Feb. 4, 2022

(65) Prior Publication Data

US 2023/0251149 A1 Aug. 10, 2023

(51) Int. Cl.
*G01L 1/24* (2006.01)
*G01L 5/00* (2006.01)

(52) U.S. Cl.
CPC .............. *G01L 1/24* (2013.01); *G01L 5/0061* (2013.01)

(58) Field of Classification Search
CPC .... G01L 1/24; G01L 1/04; G06F 3/01; H04N 7/18; G01B 11/24; B25J 15/0009; B25J 19/021
See application file for complete search history.

(56) References Cited

U.S. PATENT DOCUMENTS

| | | | | |
|---|---|---|---|---|
| 6,909,084 | B2 * | 6/2005 | Tachi | G01L 1/247 250/221 |
| 7,659,502 | B2 * | 2/2010 | Tachi | G01L 5/228 250/221 |
| 7,707,001 | B2 * | 4/2010 | Obinata | G01N 19/02 702/41 |
| 9,423,243 | B1 * | 8/2016 | Ikeda | G01B 11/168 |

(Continued)

FOREIGN PATENT DOCUMENTS

| | | |
|---|---|---|
| CN | 112930868 A | 6/2021 |
| CN | 214793556 U | 11/2021 |

(Continued)

OTHER PUBLICATIONS

Patel et al., Digger finger: GelSight tactile sensor for object identification inside granular media. Feb. 20, 2021.

(Continued)

*Primary Examiner* — Octavia Hollington

(74) *Attorney, Agent, or Firm* — Wolf, Greenfield & Sacks, P.C.

(57) ABSTRACT

A retrographic sensor includes a flexible transparent structure, a transparent elastomeric pad, and an at least partially reflective layer. The flexible transparent structure may be configured to elastically deform between multiple configurations. At least one light source emits light into the transparent structure. The flexible transparent structure may include one or more markers that are illuminated by the at least one light source. The retrographic sensor may also include a photosensitive detector configured to image the (Continued)

flexible transparent structure and one or more markers. A processor may determine a configuration of the flexible transparent structure based at least in part on an image from the one or more markers.

19 Claims, 11 Drawing Sheets

(56) References Cited

U.S. PATENT DOCUMENTS

| | | | |
|---|---|---|---|
| 11,703,321 B2* | 7/2023 | Adelson | B25J 15/0009 |
| | | | 356/513 |
| 2009/0315989 A1* | 12/2009 | Adelson | G01L 1/24 |
| | | | 348/135 |
| 2020/0246980 A1 | 8/2020 | Kuppuswamy et al. | |
| 2021/0023713 A1 | 1/2021 | Zhang et al. | |
| 2021/0023714 A1 | 1/2021 | Zhang et al. | |
| 2021/0101292 A1 | 4/2021 | Kuppuswamy et al. | |
| 2021/0107165 A1 | 4/2021 | Yerazunis et al. | |
| 2021/0146532 A1 | 5/2021 | Rodriguez Garcia et al. | |

FOREIGN PATENT DOCUMENTS

| | | | | |
|---|---|---|---|---|
| JP | 2017096782 A | * | 6/2017 | |
| JP | 2020125973 A | * | 8/2020 | |
| RU | 2354943 C2 | * | 5/2009 | G01L 1/241 |
| RU | 2358247 C2 | * | 6/2009 | B25J 13/084 |
| WO | WO 2020/041221 A1 | | 2/2020 | |
| WO | WO 2021/244939 A1 | | 12/2021 | |

OTHER PUBLICATIONS

Zhou et al., A tactile-enabled grasping method for robotic fruit harvesting. Oct. 18, 2021. 7 pages.

* cited by examiner

FLEXIBLE OPTICAL TACTILE SENSOR

GOVERNMENT LICENSE RIGHTS

This invention was made with government support under N00014-18-1-2815 awarded by the Office of Naval Research (ONR). The government has certain rights in the invention.

FIELD

Disclosed embodiments are related to flexible optical tactile sensors, retrographic sensors, and related methods of use.

BACKGROUND

The sense of touch contributes to the dexterity of human manipulation, especially in cases where high precision is desirable. The complex ensemble of mechanoreceptors in the human hand provides extremely rich tactile sensory signals. These sensory signals encode information such as contact force and contact shape and such signals can be used to detect complex state transitions such as making or breaking contact or the occurrence of slippage between the finger and the grasped object.

Vision based tactile sensors have become employed with robotic systems due to their high signal resolutions and the softness of their sensing surfaces. The softness of the sensing surface allows for larger contact regions as it deforms to conform with the object surface. The resulting contact areas are then characterized in detail via the high-resolution signals. Together, these properties have enabled the use of these sensors in tackling several tasks such as assessing grasp success, determining a texture of object surfaces, detecting slip and shear force, reconstructing three-dimensional surfaces, and distinguishing between different cloth materials. However, conventional sensors are constrained to flat or nearly flat designs. Additionally, conventional sensors are rigid and do not accommodate flexible manipulators.

SUMMARY

In some embodiments, a retrographic sensor includes a flexible transparent structure including an interior surface, an exterior surface, and one or more side surfaces extending between the interior surface and the exterior surface, where the flexible transparent structure is configured to elastically deform about at least one axis. The retrographic sensor also includes a transparent elastomeric pad disposed on the exterior surface of the flexible transparent structure, an at least partially reflective layer disposed on the transparent elastomeric pad such that the transparent elastomeric pad is disposed between the at least partially reflective layer and the flexible transparent structure, and at least one light source disposed adjacent at least a first side surface of the one or more side surfaces, where the at least one light source is configured to emit light into the flexible transparent structure.

In some embodiments, a method of operating a retrographic sensor includes illuminating one or more markers disposed on a surface of a flexible transparent structure with at least one light source, imaging the flexible transparent structure to obtain a first image, determining a configuration of the flexible transparent structure based at least in part on the first image and reference data related to the one or more markers, obtaining a reference image associated with the configuration of the flexible transparent structure, and obtaining a corrected image by comparing the first image with the reference image.

In some embodiments, a flexible gripper includes a chassis configured to elastically deform about at least one axis, the chassis including an object engaging portion and a retrographic sensor disposed in the object engaging portion. The retrographic senor includes a flexible transparent structure including an interior surface, an exterior surface, and one or more side surfaces extending between the interior surface and the exterior surface, wherein the flexible transparent structure is configured to elastically deform about the at least one axis, a transparent elastomeric pad disposed on the exterior surface of the flexible transparent structure, an at least partially reflective layer disposed on the transparent elastomeric pad such that the transparent elastomeric pad is disposed between the at least partially reflective layer and the flexible transparent structure, at least one light source disposed adjacent at least a first side surface of the one or more side surfaces, where the at least one light source is configured to emit light into the flexible transparent structure, and a photosensitive detector oriented toward the interior surface of the flexible transparent structure.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
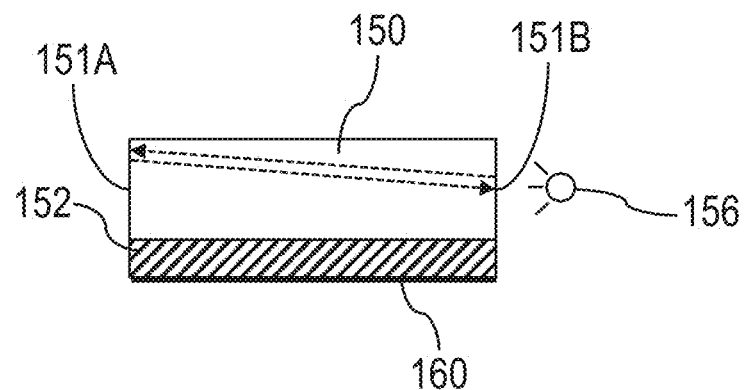
FIG. 1 is a schematic of one embodiment of a retrographic sensor.

Conventional vision based tactile sensors, including retrographic sensors, provide high resolution signals which allow an object or surface in contact with the tactile sensor to be characterized in detail. However, conventional vision based tactile sensors are constrained to rigid gripper designs with an established and constant reference frame. Based on this constant reference frame, changes in light are assumed to be a result of external contact with the tactile sensor. Nevertheless, the inventors have appreciated that it is desirable to have flexible (e.g., soft) robotic grippers that are able to incorporate vision based tactile sensors such as a retrographic sensor. In particular, the inventors have appreciated that it may be desirable to provide a vision-based sensor that is able to flex with a soft gripper and distinguish changes in light from a change in the configuration of the sensor from changes in light due to external contact with an object. Such a sensor may be able to produce a point cloud in three-dimensional space that reflects both a compliance of the gripper and any external contact forces with objects being grasped by the gripper.

In view of the above, the inventors have recognized the benefits of a retrographic sensor including a flexible substrate (e.g., a flexible transparent structure) that is able to elastically deform with a flexible robotic gripper. The retrographic sensor may include an elastomeric pad disposed on the flexible substrate, such that the elastomeric pad matches a configuration of the flexible substrate. The elastomeric pad may be compliant, such that the elastomeric pad deforms when the elastomeric pad contacts an object. A processor associated with the retrographic sensor may be configured to determine a configuration of the flexible substrate. The determined configuration may be employed to obtain reference data associated with that configuration for use in determining a corrected image that may be analyzed further to reconstruct a three-dimensional surface of an object being grasped. The determined configuration may also be used to establish a reference plane of the retrographic sensor, such that a point cloud may be formed in three-dimensional space reflecting both the configuration of the retrographic sensor and any external contact forces with objects being grasped.

In some embodiments, a retrographic sensor includes a flexible transparent structure. The transparent structure may include an interior surface, an exterior surface, and one or more side surfaces extending between the interior surface and the exterior surface. The flexible transparent structure may be elastically deformable about at least one axis. For example, the flexible transparent structure may be bendable about a single axis (e.g., having one degree of freedom). The flexible transparent structure may function as a base for the retrographic sensor and may establish a reference plane for the various configurations which the retrographic sensor may adopt (e.g., by elastically deforming the flexible transparent structure). The retrographic sensor may include an elastomeric pad disposed on the flexible transparent structure. The retrographic sensor may also include an at least partially reflective layer (e.g., semi-specular, matte, etc.) disposed on the elastomeric pad configured to reflect light toward the transparent structure. Accordingly, deformation of the elastomeric pad (e.g., by contact with an external object) changes the directions and intensities of light reflected toward the transparent structure, which may be imaged by a photosensitive detector. The retrographic sensor may also include at least one light source disposed adjacent the one or more side surfaces of the transparent structure which emits light into the transparent structure to illuminate the elastomeric pad. The retrographic sensor may also include a photosensitive detector (e.g., a camera) oriented toward an interior surface of the flexible transparent structure configured to image the transparent structure. Light reflected off the at least partially reflective layer may be received by the photosensitive detector and included in the image.

As discussed above, the inventors have appreciated the benefits of a retrographic sensor that may compensate for changes in a configuration of the retrographic sensor relative to an initial undeformed configuration. For example, for a retrographic sensor including a flexible transparent structure and elastomeric pad, the bending of that structure (e.g., in response to external contact forces, or gripper forces) may correspondingly change the configuration of the elastomeric pad. Accordingly, in some instances an image of the transparent structure may change even without any contact with an object. In some embodiments, the flexible transparent layer may include one or more markers. The one or more markers may be disposed on an exterior and/or interior surface of the flexible transparent structure and may be employed by the retrographic sensor to establish a new reference plane for difference configurations of the retrographic sensor. In some embodiments the one or more markers may be arranged as an array of markers on the transparent structure. In such embodiments, markers may be arranged in one or more rows and/or one or more columns in a predetermined spacing. Of course, any suitable number of markers may be employed in any suitable arrangement on a transparent structure, as the present disclosure is not so limited. According to exemplary embodiments herein, the one or more markers may be distinguishable in an image produced by a photosensitive detector of the retrographic sensor. In some embodiments, the one or more markers may reflect a color of light different than light reflected by an at least partially reflective layer. For example, the one or more markers may reflect a distinct wavelength band (e.g., color) of light different from wavelength bands of light employed to illuminate an elastomeric pad of a retrographic sensor (e.g., the wavelength bands may be substantially non-overlapping). In some embodiments, the one or more markers may be configured to emit fluorescent light when illuminated by at least one excitation light source. In some such embodiments, the fluorescent light emitted from the one or more markers may have a different wavelength band from the light emitted by the at least one light source. Of course, while reflective and/or fluorescent markers are noted above, any appropriate type of marker capable of being distinguished in an image based on color, shape, texture, contrast, and/or other characteristic may be used as the disclosure is not limited to a specific type of marker.

In some embodiments, a retrographic sensor may include a processor configured to produce a corrected image based on a configuration of the retrographic sensor (e.g., a state of elastic deformation) using one or more markers disposed on a flexible transparent structure of the retrographic sensor. In some embodiments, the one or more markers may be illuminated with at least one light source. In some embodiments, the one or more markers may be imaged by a photosensitive detector to obtain a first image, which may be provided to the processor. The processor may be configured to determine a configuration of the flexible transparent structure from the image and reference data related to the one or more markers. For example, the processor may extract positions of the one or more markers using a technique such as dot segmentation, machine learning, or another appropriate technique. In some embodiments, the reference data may be reference positions of markers, and the positions of the one or more markers may be compared with known reference marker positions for various configurations of the flexible transparent structure. For example, in some embodiments a distance between the extracted positions and the reference positions may be determined by the processor, with the determined configuration being identified based on a minimum difference between the extracted positions and reference positions (e.g., nearest neighbor lookup). Of course, any suitable technique may be employed to determine a configuration of the flexible transparent structure as the present disclosure is not so limited. For example, in some embodiments, the extracted positions may be compared to a resting configuration and the configuration determined based on the geometry and known kinematics of the flexible transparent substrate. In some embodiments, the processor may obtain a reference image associated with the determined configuration of the flexible transparent structure. This reference image may be employed to correct the first image for the configuration of the flexible transparent structure. For example, in some embodiments, a difference image may be produced using the first image and the reference image. This difference image may be employed to reconstruct a grasped object's surface, produce a three-dimensional point cloud, or any other desirable further processing.

According to exemplary embodiments described herein, reference data may be employed to allow a processor to determine a configuration of a retrographic sensor. In some embodiments, reference data may be obtained from the retrographic sensor itself (e.g., during a calibration process). In some embodiments, a flexible transparent structure of the retrographic sensor may be placed in a first configuration. One or more markers disposed on a surface (e.g., an interior or exterior surface) of the transparent structure may be illuminated with a light source. A processor of the retrographic sensor may determine reference data associated with the current configuration of the flexible structure. For example, the processor may identify the positions of the one or more markers. In some embodiments, the one or more markers may be imaged by a photosensitive detector, which the processor may process to extract the positions of the one or more markers. The processor may store the reference data associated with the current configuration of the flexible transparent structure. In some embodiments, the reference data may include the image of the flexible transparent structure (e.g., from the photosensitive detector). Further, in some embodiments, this image may function as a reference image for the current configuration of the retrographic sensor and may be a basis for a comparison with a subsequent image taken when the retrographic sensor is grasping an object in that configuration. In some embodiments, the above steps may be repeated for additional configurations of the flexible transparent substrate to provide reference data associated with a multiple configurations of the retrographic sensor. In some embodiments, the flexible transparent structure and one or more markers maybe videoed by a photosensitive detector as the flexible transparent structure moves through all possible configurations (e.g., through an entire range of motion of the retrographic sensor). In such embodiments, the video may be stored, and individual frames of the video may be employed as reference images and/or analyzed to provide the desired reference data related to the makers corresponding to individual discretized configurations.

In addition to the above, the inventors have appreciated that is may be desirable to estimate the forces being applied to a robotic gripper. For example, shear forces may be applied to the gripper because of gripper movement, gravity on a grasped object, or other external forces. Such forces may be employed to estimate orientation of an object. Conventional vision-based tactile sensors provide for surface reconstruction, but do not provide an estimation of shear forces.

In view of the above, the inventors have appreciated the benefits of a retrographic sensor including one or more pad markers disposed on an elastomeric pad that may be employed by the retrographic sensor to estimate forces applied to the elastomeric pad. The inventors have appreciated that as an elastomeric pad is volume preserving but moves under shear forces, one or more pad markers disposed on an external surface of the elastomeric pad may be tracked and/or compared with reference positions to be able to determine the shear forces applied to the elastomeric pad. These shear forces may be output to a user in the form of a graphic representation of the forces or may be employed to compute or estimate the magnitude and direction of the shear forces. Such an arrangement may allow for improved object orientation detection compared with conventional vision-based sensors that do not estimate shear forces.

In some embodiments, a retrographic sensor includes a flexible transparent structure and a transparent elastomeric pad disposed on the flexible transparent structure. The elastomeric pad may include an exterior surface configured to form a contact for a robotic gripper which engages an object. The elastomeric pad may include one or more pad markers disposed on the exterior surface, which may be visible through the transparent structure and elastomeric pad by a photosensitive detector. The one or more pad markers may be painted, etched, bonded, or otherwise provided on the elastomeric pad in any other suitable arrangement which may be detected and imaged by the photosensitive detector. In some embodiments the one or more pad markers may be arranged as an array of markers on the elastomeric pad. In such embodiments, the pad markers may be arranged in one or more rows and one or more columns in a predetermined spacing. Of course, any suitable number of pad markers may be employed in any suitable arrangement on any suitable portion of an elastomeric pad, as the present disclosure is not so limited. According to exemplary embodiments herein, the one or more pad markers may be distinguishable in an image produced by a photosensitive detector of the retrographic sensor. In some embodiments, the one or more pad markers may reflect a color of light different than light reflected by an at least partially reflective layer or may reflect substantially no light (e.g., the markers may be black). For example, the one or more pad markers may reflect a distinct wavelength band (e.g., color) of light different from wavelength bands of light employed to illuminate an elastomeric pad of a retrographic sensor (e.g., the wavelength bands may be substantially non-overlapping). In some embodiments, the one or more pad markers may be configured to emit fluorescent light when illuminated by at least one light source. In some such embodiments, the fluorescent light emitted from the one or more pad markers may have a different wavelength band from the light emitted by the at least one light source. Of course, while reflective, etched, and/or fluorescent pad markers are noted above, any appropriate type of pad marker capable of being distinguished in an image based on color, shape, texture, contrast, and/or other characteristic may be used as the disclosure is not limited to a specific type of pad marker.

In some embodiments, a process of estimating forces on an elastomeric pad of a retrographic sensor includes illuminating one or more pad markers disposed on a surface (e.g., an exterior surface) of the elastomeric pad with a light source. The position of the one or more pad markers may be determined by a processor of the retrographic sensor. For example, in some embodiments the processor may perform dot segmentation, machine learning, or another process to identify the positions of the one or more pad markers. The determined position of the one or more pad markers may be compared to known reference positions of the one or more markers. For example, the nearest reference position neighbor for each pad marker position may be determined, and the distance between the determined position and the reference position may be determined. The difference in position between the determined position and the reference position may correspond to a particular shear force applied to the elastomeric pad to move the pad marker from its reference position. Accordingly, the processor may determine shear forces applied to the elastomeric pad based at least in part on this difference in position.

In addition to the above, the inventors have appreciated that vision-based tactile sensors are sensitive to external light intrusion. That is, external light may interfere with the light received by a photosensitive detector, reducing the accuracy or precision of the retrographic sensor. As conventional sensors have a substantially rigid base, the external light may be blocked from interfering with the sensor by rigid light blocking materials. However, flexible grippers and corresponding flexible sensors cannot employ rigid light blocking materials as such materials would impede the compliance of the sensor.

In view of the above, the inventors have appreciated the benefits of a robotic gripper employing a flexible light-blocking fabric or other flexible light-blocking material which is able to flex and deform with the gripper to block light from a retrographic sensor without interfering with the compliance of the gripper. In some embodiment, a gripper may be configured to bend about a single axis (e.g., the gripper may have one degree of freedom). A light blocking material may be cut to fit a chassis of the gripper, such that an internal volume of the gripper is dark and substantially free from external light intrusion. The light blocking material may be a fabric and may be extensible (e.g., elastic) to allow the light blocking material to adapt and flex to match the compliance of the gripper. The light blocking material may inhibit external light from entering the interior volume of the gripper as the gripper moves through its entire range of motion.

According to exemplary embodiments described herein, a retrographic sensor includes a flexible transparent structure including an interior surface, an exterior surface, and one or more side surfaces. The transparent structure may be elastically deformable about at least one axis (e.g., a single axis) and may be transparent to one or more wavelength bands of light. In some embodiments, the transparent structure may be formed as a rectangular block (e.g., a rectangular prism). Of course, any suitable curved shape may be employed, as the present disclosure is not so limited.

In some embodiments, a retrographic sensor may include at least one light source (e.g., a plurality of light sources) configured to emit light into a transparent structure and elastomeric pad. One or more light sources may emit any suitable wavelength of light that illuminates the transparent structure and elastomeric structure. In some embodiments, the at least one light source is configured to emit light in a visual wavelength (e.g., between 380 and 700 nm). In some embodiments, light of three different wavelengths, may be emitted by a plurality of light sources into a transparent structure along three different side surfaces of the transparent structure. For example, a first wavelength of light emitted into the transparent structure may be between 635 nm and 700 nm (corresponding to the color red), a second wavelength of light emitted into the transparent structure may be between 560 nm and 520 nm (corresponding to the color green), and a third wavelength of light emitted into the transparent structure may be between 490 and 450 nm (corresponding to the color blue). Of course, one or more light sources may emit any suitable wavelength(s) of light into a transparent structure of a retrographic sensor at any suitable angle, as the present disclosure is not so limited. For example, in some embodiments, one or more light sources may emit electromagnetic radiation in any appropriate range of wavelengths, including ultraviolet, near-infrared, infrared, etc. Correspondingly, a photosensitive detector of a retrographic sensor may be configured to receive and detect electromagnetic radiation emitted from the one or more light sources, where that electromagnetic radiation has any appropriate range of wavelengths. Accordingly, while exemplary embodiments described herein employ visual light in a range of 380 nm to 700 nm, any suitable wavelength of electromagnetic radiation may be employed, as the present disclosure is not so limited.

In some embodiments, a retrographic sensor may include one or more fluorescent layers disposed on a side surface of a flexible transparent structure and/or elastomeric pad which are configured to act as light sources to illuminate the transparent structure and elastomeric pad. In some embodiments, the retrographic sensor may include a first fluorescent layer disposed on at least a first side surface of the one or more side surfaces of the transparent structure. The first fluorescent layer may be configured to emit first fluorescent light when excited by light from at least one light source. That is, in some embodiments the at least one light source may include one or more excitation light sources. The first fluorescent light from the first fluorescent layer is configured to illuminate an at least partially reflective layer disposed on an exterior surface of the elastomeric pad. In some embodiments, the fluorescent layer may include fluorescent paint. In some embodiments, the retrographic sensor may include a second fluorescent layer disposed on at least a second side surface of the one or more side surfaces of the transparent structure. The second fluorescent layer may be configured to emit second fluorescent light when excited by light from at least one light source. The second side surface may be opposing or non-parallel to the first side surface. In some embodiments, the first fluorescent light and the second fluorescent light may be substantially non-overlapping wavelength bands of light (e.g., different colors). Such an arrangement may allow photometric stereo to be employed at a photosensitive detector. In some embodiments, one or more markers disposed on a transparent structure and/or elastomeric pad may also be fluorescent and configured to emit marker light when excited by one or more excitation light sources.

In some embodiments, one or more excitation light sources may emit light having a wavelength greater than or equal to 200 nm, 280 nm, 315 nm, 380 nm, and/or any other suitable wavelength. Correspondingly, one or more excitation light sources may emit light having a wavelength less than or equal to 500 nm, 490 nm, 450 nm, 400 nm, 315 nm, 280 nm, and/or any other suitable wavelength. Combinations of these values are contemplated, including wavelengths between 200 nm and 500 nm (spanning ultraviolet to the color blue), 200 nm and 380 nm (corresponding to ultraviolet), 315 nm and 400 nm (corresponding to ultraviolet A), 380 nm and 490 nm (spanning the colors violet to blue), as well as 450 nm and 490 nm (corresponding to the color blue). In some embodiments, the one or more excitation light sources may be configured to emit short-wave light. Of course, one or more excitation light sources may emit any suitable wavelength configured to excite fluorescent emissions from one or more fluorescent layers or fluorescent markers, as the present disclosure is not so limited. According to exemplary embodiments described herein, an excitation light source may include one or more LEDs, incandescent bulbs, compact fluorescent (CFL) bulbs, or any other suitable light source, as the present disclosure is not so limited.

In some embodiments, one or more excitation light sources may excite multiple fluorescent layers configured to emit fluorescent light in different wavelength bands. According to these embodiments, a single type of excitation light source emitting a single wavelength band of light may be employed to excite fluorescence in multiple fluorescent layers to illuminate an at least partially reflective layer of a retrographic sensor with light of different wavelength bands (which may correspond to different colors). In other embodiments, multiple excitation light sources of different types may excite multiple fluorescent layers of different types. According to these embodiments, a first excitation light source may emit light in a first wavelength band which is configured to excite a first fluorescent layer that then emits fluorescent light in a first fluorescent wavelength band. A second excitation light source may emit light in a second wavelength band which is configured to excite a second fluorescent layer than then emits fluorescent light in a second fluorescent wavelength band. The first wavelength band and the second wavelength band may be different, such that the different fluorescent layers may be independently excited. Likewise, the first fluorescent wavelength band and second fluorescent wavelength band may be different so as to provide different wavelengths of light illuminating a transparent structure. In some embodiments, a first dominant fluorescent wavelength may be different than a second dominant fluorescent wavelength. According to such an embodiment, the first fluorescent wavelength band and second fluorescent wavelength band may partially overlap, but the dominant or peak wavelengths may be different from one another. Of course, wavelength bands of light from multiple light sources and/or fluorescent layers may overlap or be the same or substantially the same, as the present disclosure is not so limited.

As used herein, two wavelength bands may be substantially non-overlapping when light emitted by a first source (e.g., a first light source and/or a fluorescent layer or marker) and a second source (e.g., a second light source and/or a fluorescent layer or marker) are primarily emitted at different wavelengths. For example, a majority of the light emitted by the first source may be in a wavelength band that is different from the wavelength band where a majority of the light is emitted by the second source. However, due to excitation light sources and fluorescent light emissions typically being emitted over a broad range of wavelengths with different intensities, there is likely to be some small amount of light emissions at wavelengths associated with another wavelength band. However, emissions from an excitation light source and/or fluorescent surface outside of the associated wavelength bands may have intensities that are significantly less than an intensity of light emitted at wavelengths within the wavelength band of that source. For example, intensities of light emitted from a source at wavelengths outside of a wavelength band may be 5% or less than a peak intensity of wavelengths emitted from the source within the wavelength band.

According to exemplary embodiments described herein, one or more fluorescent layers of a retrographic sensor may be excited from either an exterior surface of the one or more fluorescent layers or an interior surface of the one or more fluorescent layers. An exterior surface of the one or more fluorescent layers may face outward from a transparent structure on which the one or more fluorescent layers are disposed. An interior surface of the one or more fluorescent layers may face inward into a transparent structure on which the one or more fluorescent layers are disposed. In some embodiments, one or more excitation light sources may emit light toward the exterior surface of the one or more fluorescent layers. In such an embodiment, the one or more fluorescent layers may be excited and emit fluorescent light into the transparent structure. In other embodiments, one or more excitation light sources may emit light toward the interior surface of the one or more fluorescent layers. For example, one or more excitation light sources may emit light directly incident on the interior surface of the one or more fluorescent layers. As another example, one or more excitation light sources may emit light into the transparent structure where it undergoes internal reflection until the light encounters the one or more fluorescent layers. Once exciting light encounters the one or more fluorescent layers, the one or more fluorescent layers may be excited and emit fluorescent light into the transparent structure. Accordingly, the retrographic sensor according to exemplary embodiments described herein may be illuminated by one or more excitation light sources from an exterior or interior of the retrographic sensor.

In some cases, the one or more excitation light sources and/or fluorescent layers of a retrographic sensor may emit light that excites auto-fluorescence in one or more components of a system. That is, in some cases, materials that would otherwise be appropriate for illumination under light in visual wavelength bands, may be excited and fluoresce when exposed to light that excites the one or more fluorescent layers. When the transparent structure and/or elastomeric pad of a retrographic sensor fluoresce, the light from these sources may be nuisance illumination and such illumination may impair the ability of the retrographic sensor to sense surface profiles when the elastomeric pad is deformed. Accordingly, the inventors have appreciated a retrographic sensor employing materials that do not fluoresce under illumination from the one or more excitation light sources, or at least fluoresce by a substantially reduced amount relative to the intensity of fluorescence from the fluorescent layers of the device. In particular, in some embodiments, the inventors have appreciated a retrographic sensor employing materials that emit fluorescent light having an intensity at least an order of magnitude less than fluorescent light from one or more fluorescent layers when illuminated by electromagnetic radiation from the one or more excitation light sources. In some embodiments, a retrographic sensor may employ materials that emit fluorescent light at least two orders of magnitude less than fluorescent light from one or more fluorescent layers when illuminated by electromagnetic radiation from the one or more excitation light sources. Of course, any suitable order of magnitude difference in the intensity of light emitted from components of the retrographic sensor and one or more fluorescent layers may be employed, as the present disclosure is not so limited. In some embodiments, retrographic sensor may employ materials that emit fluorescent light an intensity less than 1% of an intensity of fluorescent light from one or more fluorescent layers when illuminated by electromagnetic radiation from the one or more excitation light sources.

In some embodiments, a flexible transparent structure of a retrographic sensor may be formed of a transparent plastic such as acrylic, or a flexible glass. Of course, any suitable material may be employed for a transparent structure, as the present disclosure is not so limited. In some embodiments, an elastomeric pad of a retrographic sensor may be formed of silicone rubber, Polydimethylsiloxane (PDMS), thermoplastic elastomer (TPE), or polyurethane. Of course, any suitable material may be employed for an elastomeric pad, as the present disclosure is not so limited. In some embodiments, an at least partially reflective layer may be formed of aluminum powder deposited in a layer. In some embodiments, the aluminum powder may be formed of round or amorphous particulates, so as to provide a Lambertian surface. In some embodiments, the aluminum particles may have diameter between 10 nm and 10 microns. In some embodiments, the aluminum particles may have a diameter between 0.5 microns and 2 microns. Of course, any suitable material for an at least partially reflective layer may be employed, as the present disclosure is not so limited. In some embodiments, each of the materials listed above may not substantially fluoresce compared to fluorescence of one or more fluorescent layers.

In some embodiments, a retrographic sensor may include one or more filters disposed on one or more side surfaces of the transparent structure. In such an embodiment, the one or more filters may be in optical contact with the transparent structure, and one or more fluorescent layers or other light sources may be disposed on an exterior surface of the one or more filters. Accordingly, the one or more filters may be positioned between the transparent structure and the light sources. The presence of the filters may reduce nuisance illumination. With filters disposed on opposing side surfaces of the transparent structure, the filters attenuate reflected rays more so than direct illumination from the one or more light sources, That is, any reflected nuisance illumination will be attenuated thrice by filters, once on first entry to the transparent structure through a first filter, once when the light exits the structure into a second filter on an opposite side of the structure, and once when the light potentially reflects from the fluorescent layer adjacent the second filter on an opposite side of the structure. In contrast, direct light from a light source passes through a filter only once. In this manner, nuisance illumination in the retrographic sensor may be further reduced. In some embodiments, there is no air gap between the filter and the transparent rigid structure. The lack of an air gap reduces or eliminates any lensing effect between the filter and the transparent rigid structure.

In some embodiments a filter employed with a retrographic sensor may be a neutral density (ND) filter. In other embodiments, a filter employed with a retrographic sensor may be a colored filter configured to absorb wavelengths of light other than a particular wavelength or wavelength band of light. In such an arrangement, at least one light source may emit two or more wavelengths of light from different sides of a transparent structure, as will be discussed further with reference to other embodiments. Accordingly, in some embodiments, multiple filters of different colors may be employed corresponding to wavelengths emitted by the at least one light source. For example, a first fluorescent layer emitting a blue wavelength of light may be adjacent a blue colored filter on a first side of the transparent structure, while a second fluorescent layer emitting a red wavelength of light may be adjacent a red filter on a second side (e.g., opposite side) of the transparent structure. The blue filter may absorb a significant portion of the red wavelength of light that could reflect as nuisance illumination if not fully absorbed, and likewise the red filter may absorb a significant portion the blue wavelength of light that could reflect as nuisance illumination if not fully absorbed. Accordingly, in some embodiments, a filter may be configured to absorb wavelengths of light other than a fluorescent emission wavelength or emission wavelength band of a fluorescent layer disposed on the filter. Of course, any suitable filter arrangement may be employed including any number of filters of different colors or of the same color, as the present disclosure is not so limited.

In some embodiments, a filter employed in a retrographic sensor disposed between at least one light source (e.g., a fluorescent layer) and a transparent structure may be configured to absorb at least a portion of the light from the at least one light source. Accordingly, the effects of light reflecting off one or more side surfaces of the transparent structure may be reduced, as the filter may attenuate the light each time the light from the at least one light source passes through the filter. In some embodiments, a filter may be configured to absorb greater than or equal to 25%, 35%, 50%, 60%, 70%, 80%, 85% and/or any other suitable percentage of light emitted from the at least one light source. Correspondingly, a filter may be configured to absorb less than or equal to 99%, 90%, 80%, 70%, 60%, 50%, 40%, 25% and/or any other suitable percentage of light emitted from the at least one light source. Combinations of the above-noted ranges are contemplated, including percentages of absorption of light from the at least one light source between 50% and 80%, 60% and 80%, 50% and 60%, as well as 25% and 50%. Of course, a filter may absorb any suitable percentage of light from the at least one light source, as the present disclosure is not so limited. It should be noted that any suitable percentage of light may be absorbed by the filter and an absorption percentage may be at least partly based on the power of light emitted from the at least one light source. That is, the power of light emitted from the at least one light source may affect the amount of light ultimately reaching a photosensitive detector, and thus the absorption percentage of a filter may be selected such that an appropriate amount of light reaches the photosensitive detector.

In some cases, it may be desirable to increase the perceptibility of deformations of an elastomeric pad employed with an at least partially reflective layer as perceived by a photosensitive detector. In some embodiments, a photosensitive detector (e.g., an imaging device, camera, etc.) may include one or more color channels configured to perceive different wavelengths of light, like other embodiments discussed previously. To utilize these separate channels in some photosensitive detectors, in some embodiments a retrographic sensor may employ at least two different light sources (e.g., fluorescent layers) emitting at least two different wavelengths of light positioned along multiple separate side surfaces of a transparent structure disposed at different angles relative to one another. While exemplary embodiments described herein refer to singular wavelengths, it should be appreciated that in other embodiments singular wavelengths (e.g., dominant wavelengths) may correspond to a band of wavelengths, as the present disclosure is not so limited. For example, light of a first wavelength may be emitted into the transparent structure in a first direction using a first light source (e.g., a first fluorescent layer) positioned on a first side of the transparent structure, while light of a second wavelength is emitted into the transparent structure in a second different direction using a second light source (e.g., a second fluorescent layer) positioned on a second side of the transparent structure. The at least two different wavelengths of light maybe perceived by a photosensitive detector configured to perceive the first wavelength and second wavelength of light on separate channels. Such an arrangement may allow for more precision in characterizing a surface or object in contact with an at least partially reflective layer. For example, the different wavelengths of light may enable photometric stereo processing.

According to exemplary embodiments of the sensors including semi-specular reflective or matte layers described herein, a retrographic sensor may include an imaging device. The imaging device may be a camera or other appropriate type of photosensitive detector directed towards a flexible transparent structure (e.g., a block, a shell, etc.). For example, in one embodiment, an imaging device may include separate imaging channels capable of separately detecting different wavelengths of light. In one such embodiment, the imaging device may be a red green blue (RGB) camera or any other suitable camera suitable for receiving reflected light from a transparent structure. The imaging device may pass a signal corresponding to an image of the sensor assembly to a processor for processing. The processor may be configured to execute computer readable instructions stored in volatile or non-volatile memory. In some instances, and as described further below, the processor may use the signal to determine information about an object or surface in contact with the sensor which may then be used for controlling a robotic system, such as a robotic gripper, associated with the sensor. In some embodiments, a photosensitive detector may not be physically oriented toward a transparent structure but may instead be visually oriented toward the transparent structures via one or more mirrors. In this manner, a photosensitive detectors may be physically oriented in any suitable orientation, as the present disclosure is not so limited.

According to exemplary embodiments described here, a fluorescent layer or marker may include any suitable pigments, dyes, or other materials configured to emit light in a wavelength band when excited by electromagnetic radiation from one or more excitation light sources. In some embodiments, a fluorescent layer may include fluorescent paint. In some embodiments one or more fluorescent layers of a retrographic sensor may be configured to emit fluorescent light in the visible spectrum (380 to 700 nm). Of course, one or more fluorescent layers or markers may emit light in any suitable wavelength band, as the present disclosure is not so limited.

While embodiments described herein include a flexible transparent structure having a rectangular prism shape, any suitable shape may be employed for a retrographic sensor, as the present disclosure is not so limited. For example, curved shapes for a structure may also be employed. The transparent structure may form an overall shape matching the retrographic sensor. That is, in some embodiments, the elastomeric pad and an at least partially reflective layer may have a shape matching that of the underlying flexible transparent structure. In some embodiments, a flexible transparent structure may be constrained to elastically deform about one or more axes. That is, the flexible transparent structure may have predictable deformation one or more directions. Such a constraint may ensure reference data such as reference images are appropriate for comparison to the various possible configurations of the flexible transparent structure. According to exemplary embodiments described herein, a flexible transparent structure may have an angle of bending based at least partially on a material index of refraction. That is, in some embodiments, a flexible transparent structure may have a material index of refraction that allows light directed inside of the structure to be able light pipe and illuminate the structure. The flexible transparent structure may have an angle of bending such that the ability of light to pipe within the structure is not substantially impeded by the angle of bending.

In some embodiments, the assembly of a retrographic sensor may effectively function as a light pipe such that the elastomeric pad is uniformly lit from one or more light sources. In one embodiment, one or more light sources may be positioned at one or more side surfaces of the transparent structure, where the one or more side surfaces of the transparent structure extend between an interior surface (e.g., curved interior surface) and an exterior surface (e.g., curved exterior surface) of the structure. The one or more light sources may emit light into the transparent structure from this position proximate the side surfaces of the structure, such that at least a portion of the emitted light undergoes internal reflection inside of the transparent structure and elastomeric pad, reflecting off the at least partially reflective layer and an air boundary adjacent the interior surface of the structure. This arrangement allows the light emitted to uniformly spread throughout the elastomeric pad, as the light is effectively light piped through the structure. When an object or surface contacts the at least partially reflective layer, the elastomeric pad may deform, thereby changing a reflective angle of the light in that area in a manner that may be detected by a photosensitive detector. Accordingly, the characteristics of the object or surface may be determined by the change in the light in the assembly as observed by the photosensitive detector. The photosensitive detector may be positioned to view the transparent structure side of the assembly. That is, the photosensitive detector may be physically and/or visually oriented toward an internal surface of the transparent structure opposite the elastomeric pad.

In some cases, the uniformity of the light distribution within the sensor as well as the resolution of the sensor may be at least partially dependent on the reflective characteristics of an at least partially reflective layer included in a retrographic sensor assembly. That is, the inventors have recognized that the illumination of an elastomeric pad and the ability for a photosensitive detector to detect changes in light reflection are in some ways at odds with one another. For example, use of a matte material which effectively scatters incident light in the at least partially reflective layer may result in an elastomeric pad with non-uniform lighting, with portions of the pad nearest the at least one light source being more brightly illuminated than portion further away from the at least one light source. Accordingly, the ability to detect objects or surfaces in the less illuminated areas is diminished or eliminated in such instances. As a contrasting example, use of a mirrored material in the at least partially reflective layer where light is reflected at the angle of incidence on the layer may result in difficulty detecting changes in the elastomeric pad, as any light reflecting because of deformation may be concentrated at a specific angle which may miss a photosensitive detector. Thus, the inventors have recognized the benefits of an at least partially reflective layer that is specular, as such a layer may improve both the uniformity of illumination and sensitivity of a sensor in some embodiments.

In view of the above, the inventors have recognized that the sparseness of a captured image may be reduced, and the smoothness of the shading image may be increased in some embodiments if a semi-specular membrane or coating is employed. A semi-specular membrane may be specular, in that an angle of incidence is like an angle of reflection, but the reflection has a wide specular lobe. The peak of the specular lobe will have an angle equal to that of an angle of incidence. For example, semi-specular materials may appear like blurry mirrors, like the appearance of sandblasted metal or metal flake paint. In some embodiments, a semi-specular membrane, coating, or other appropriate type of layer may be made using specular flakes such as small flakes of metal, mica, or other pigment particles that are flat and provide specular reflection from their flat sides. In a semi-specular membrane including metal flakes, the flakes may have a distribution of orientations and they may not be perfectly flat relative to a surface of an elastomeric pad on which they are disposed. Thus, there is a tendency for light to be reflected in the specular direction, but there is also a great deal of random variation about that direction. The result is that the semi-specular membrane reflectance has a broad specular lobe where the reflection angle is distributed around the expected reflection angle for a purely specular reflectance. While a semi-specular membrane according to exemplary embodiments described herein may employ a coating or membrane including specular flakes, any suitable material or coating may be employed to form a semi-specular layer, as the present disclosure is not so limited.

In view of the foregoing, in some embodiments, an at least partially reflective layer used with the embodiments of retrographic sensors described herein may be a semi-specular material with respect to light supplied by one or more light sources (e.g., visual light in a wavelength between 380 to 700 nm). In some embodiments, an at least partially reflective layer such as a semi-specular layer may have a reflectance under light from the one or more light sources greater than or equal to 50%, 60%, 75%, 80%, 90% and/or any other suitable percentage. Correspondingly, the at least partially reflective layer may have a reflectance under light from the one or more light sources less than or equal to 100%, 95%, 90%, 75%, 60%, and/or any other suitable percentage. Combinations of these values are contemplated, including an at least partially reflective layer having a reflectance under light from the one or more flight sources between 50% and 95%, between 60% and 80%, or between 75% and 100%. Of course, an at least partially reflective layer such as a semi-specular material may have any suitable reflectance under light from the one or more light sources, including a reflectance less than those noted above, as the present disclosure is not so limited.

As noted previously, in some embodiments a semi-specular material may also have a specular lobe suitable for promoting internal reflection of light emitted into a transparent structure (e.g., shell) and elastomeric pad. That is, the specular lobe of the semi-specular layer may be configured such that light emitted from at least one light source (e.g., visual light in a wavelength between 380 to 700 nm) is reflected at suitably shallow angles to promote uniform illumination of an associated elastomeric pad by a light piping effect. In some embodiments, a semi-specular layer of a retrographic sensor may have a specular lobe with a width less than or equal to 90 degrees, 75 degrees, 60 degrees, 50 degrees, 40 degrees, 30 degrees, 15 degrees, and/or another other appropriate angle when reflecting light emitted from a point light source. The width of the specular lobe may be measured as the full angle at which the intensity has fallen by ½ from its peak on either side of the lobe. For example, a specular lobe width of 10 degrees would mean that the intensity falls by ½ at an angle+5 degrees or −5 degrees from the peak of the specular lobe. Corresponding to the above, a specular lobe of the semi-specular layer may have a width greater than or equal to 2 degrees, 6 degrees, 10 degrees, 15 degrees, 20 degrees, 25 degrees, 30 degrees, and/or any other appropriate width when reflecting light emitted from a point light source. In some embodiments, the semi-specular layer employed in a sensor may have a specular lobe with a width between 6 degrees and 50 degrees, 6 degrees and 40 degrees, 15 degrees and 40 degrees, 10 and 30 degrees, and/or any other suitable angular width greater than or less than the ranges noted above when reflecting light emitted from a point light source.

According to exemplary embodiments described herein, a retrographic sensor including a flexible transparent layer may be employed with any flexible or soft robotic gripper with one or more degrees of freedom. For example, a retrographic sensor may be employed with a single axis flexible gripper such as a fin ray gripper. The fin ray gripper is configured as an A-frame structure including connective structures therebetween. Additionally, the retrographic sensor may be employed on flexible pneumatic grippers. In some instances, a retrographic sensor may be employed with soft robotics where the soft robot has predictable and/or constrained degrees of freedom. Of course, a retrographic sensor according to exemplary embodiments described herein may be employed with any robotic system, as the present disclosure is not so limited.

While in some embodiments described above include a semi-specular layer, in other embodiments a retrographic sensor may include an at least partially reflective layer configured as a matte layer, as the present disclosure is not so limited. In some such embodiments, the transparent structure may be shaped as a rectangular prism or may otherwise include a flat exterior surface.

According to exemplary embodiments described herein, an at least partially reflective layer (e.g., a semi-specular layer or matte layer) may be formed by any suitable method. In one embodiment, the layer may be formed as a membrane and joined to an elastomeric pad with an optical adhesive. In another embodiment the layer may be painted or coated on an elastomeric pad. Of course, other arrangements are contemplated, and the present disclosure is not so limited.

According to exemplary embodiments described herein, a retrographic sensor may include at least one light source. At least one light source may include, but is not limited to, active, powered light sources (e.g., light strips, individual point light sources (e.g., an individual LED), surface mounted LED, etc.) and passive light sources (e.g., fluorescent paint that fluoresces under excitation light, reflectors such as mirrors, etc.). Active light sources and passive light sources may be used alone or in combination. For example, at least one light source may include a series of surface mounted LEDs arranged in a light strip, and one or more fluorescent layers disposed on a side surface of a transparent structure. In some such embodiments, the series of surface mounted LEDs may function as both a source of illumination for the transparent structure, as well as an excitation light source for the one or more fluorescent layers. Of course, any suitable combination of light sources may be employed in a retrographic sensor, as the present disclosure is not so limited.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic of one embodiment of a retrographic sensor. As shown in FIG. 1, a flexible transparent structure 150 and elastomeric pad 152 are optically joined to form a sensor assembly. The flexible transparent structure may be configured to elastically deform (e.g., bend) about at least one axis. The retrographic sensor also includes an at least partially reflective layer 160 disposed on an exterior surface of the elastomeric pad 152. A light source 156 emits light into a side surface of the flexible transparent structure 150 to illuminate the at least partially reflective layer 160. The arrangement shown in FIG. 1 is conventional and presents issues with nuisance illumination and illumination of the at least partially reflective layer 160 near the side edges of the flexible transparent structure. As shown in FIG. 1, light that enters through side surface 151B will travel in various directions through the flexible structure and the gel pad, and some of it will strike the opposite side surface 151A. There, the light encounters an air interface, which will reflect some significant portion of light back into the flexible structure 150, where it will act as nuisance illumination that interferes with the desired shaded image. Additionally, due to the air gap between the light source 156 and the side surface 151B, the light emitted from the light source will experience a lensing effect, whereby the portions of the at least partially reflective layer 160 adjacent the side surface 151B are not well-illuminated.

Figure 2:
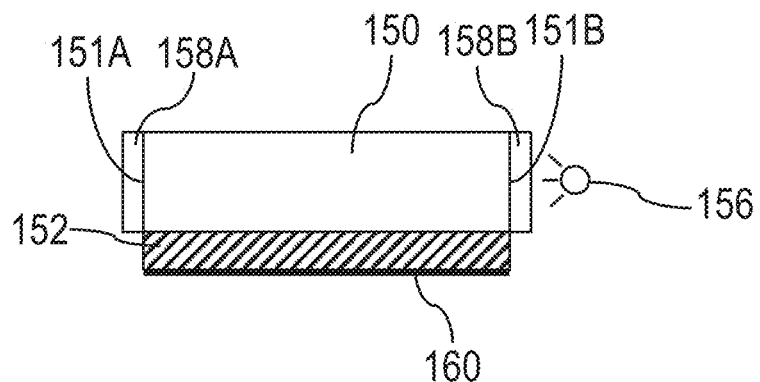
FIG. 2 is a schematic of yet another embodiment of a retrographic sensor.

In view of the challenges associated with FIG. 1, the inventors have recognized the benefit of the retrographic sensor shown in FIG. 2. As shown in FIG. 2, filters, 158A, 158B are placed in optical contact with the side surfaces 151A, 151B of the flexible structure 150. In some embodiments, these filters may be a neutral density (ND) filter, or a colored filter. When light strikes the side surface 151A from within the flexible structure 150, it travels into the filter 158A, where some portion of it is absorbed. In some embodiments, the material of the filter is index matched to that of the flexible structure, such that there is little to no reflection at the interface. In some embodiments, an ND filter may be employed that absorbs 50% or more of the light and transmits 50% or less of the light. In this embodiment, 50% or less of light incident on the ND filter from inside of the flexible structure 150 will continue through the ND filter and will strike the air interface on the outer side of the ND filter. At this point some of the light will be reflected inward back towards the flexible structure, but this reflected light will again be attenuated by the ND filter before it returns to the inside of the flexible structure. Thus, the reflected light passes through the filter twice, whereas the direct light (e.g., light from the light source 156) passes through a filter only once. Thus, the ND filter will reduce the amount of light that bounces around inside of the flexible structure and will accordingly reduce nuisance illumination, thereby improving the sensitivity of the sensor.

In some embodiments, if the light source 156 includes multiple light sources with different wavelengths, then the filters 158A, 158B may also have different absorbance properties at different wavelengths (e.g., color filters for the different color light sources). For example, if a red filter is employed on one side, but a different filter color (e.g., blue) is provided on the opposite side of the flexible structure, direct light from a light source emitting light corresponding to the color of the first filter may pass through the first filter into the flexible structure unabsorbed while the same light incident on the second filter from inside of the flexible structure may be substantially absorbed. For example, a red LED passes relatively untouched through a red filter on the way in, but when it encounters a blue filter on the other side the red light is absorbed. This use of colored filters may lead to a more efficient system, in that intensity of the input lights is not being attenuated while passing into the flexible structure 150.

According to the embodiment of FIG. 2, the filters 158A, 158B are in optical contact with the flexible structure 150. If the filters are not in optical contact with the flexible structure, the resulting air gap between the filter and the flexible structure may cause reflection at the air interface, such that the filters are not able to attenuate the reflected light.

Figure 3:
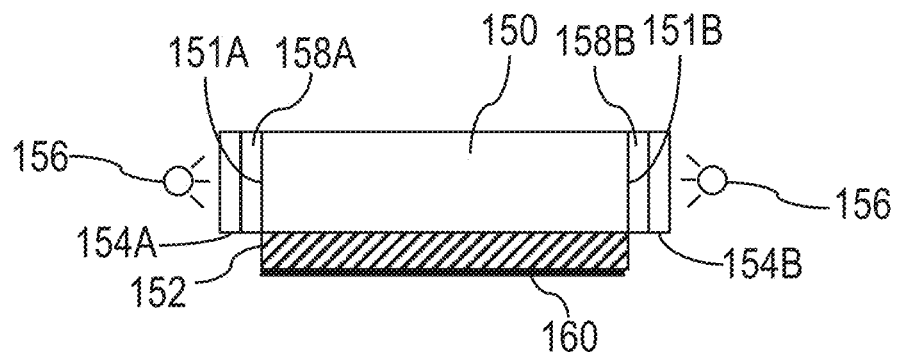
FIG. 3 is a schematic of yet another embodiment of a retrographic sensor.

FIG. 3 is a schematic of yet another embodiment of a retrographic sensor employing both diffusers 154A, 154B and filters 158A, 158B, in series. In the depicted embodiments, the diffusers 154A, 154B are disposed on and in optical contact with an exterior surface of the corresponding filters 158A, 158B which are disposed on and in optical contact with the corresponding side surfaces 151A, 151B. As shown in FIG. 3, light sources 156 shine through the diffusers, through the filters, and into the flexible structure 150. There is optical contact between these layers so there is no air gap which may cause internal reflection in any layer. Once inside of the flexible structure, the light may illuminate an elastomeric pad 152 disposed on a surface of the flexible structure extending between the two depicted side surfaces of the flexible structure. The arrangement shown in FIG. 3 may have additional benefits relative to the embodiment of FIG. 2. Namely, the arrangement reduces nuisance illumination from internal reflections back toward an originating light source and may also improve illumination of the elastomeric pad 152 nearest the side surfaces of the flexible structure 150.

The inventors have appreciated the benefits of an illumination arrangement for a retrographic sensor that allows for reduction in nuisance illumination from reflections of light and allows for illumination of edges of an elastomeric pad nearest side surfaces of a flexible transparent structure, as discussed with reference to FIGS. 1-3. However, the inventors have further appreciated an arrangement where the illumination assembly along a side surface of the flexible transparent structure with a fluorescent layer that may, in some embodiments, be easy to apply, inexpensive, and more compact than the arrangements shown in FIGS. 2-3. Exemplary embodiments including one or more such fluorescent layers are discussed further below.

Figure 4:
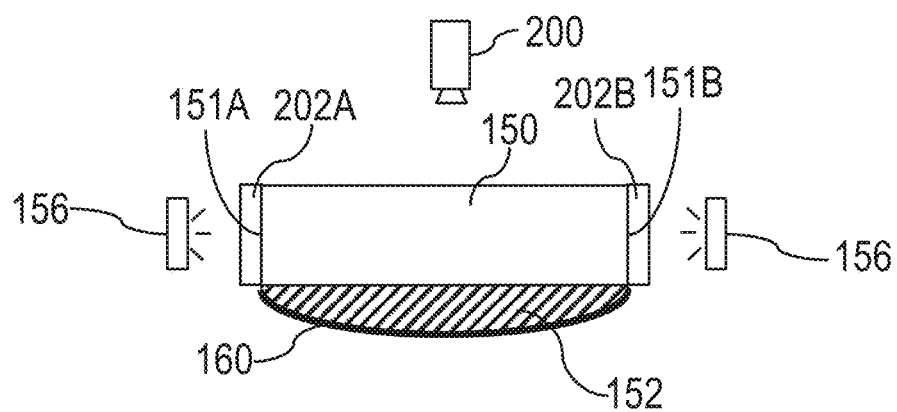
FIG. 4 is a schematic of yet another embodiment of a retrographic sensor.

FIG. 4 is a schematic of yet another embodiment of a retrographic sensor. According to the embodiment of FIG. 4, the retrographic sensors includes a first fluorescent layer 202A and a second fluorescent layer 202B disposed on a first side surface 151A and a second side surface 151B of a flexible transparent structure 150, respectively. These fluorescent layers may replace the filter and diffuser stack shown in FIG. 3, for example. The fluorescent layers may be thinner than the filters and/or diffuser, yielding a more compact retrographic sensor. In some embodiments, the light sources 156 may be ultraviolet LEDs, which excite fluorescence in the fluorescent layers 202A, 202B. In some embodiments, the first fluorescent layer and second fluorescent layer may be formed of fluorescent paint.

According to the embodiment of FIG. 4, the retrographic sensor also includes an elastomeric pad 152 which has an exterior surface covered by an at least partially reflective layer 160. When in contact with an object or other surface, the elastomeric pad 152 and at least partially reflective layer 160 may deform, thereby altering the reflections of light inside the elastomeric pad and flexible transparent structure. These differences may be perceived by a photosensitive detector 200 and interpreted (e.g., by a processor) to understand the shape or texture of the surface or object causing the deformation. While in the embodiment of FIG. 4 an elastomeric pad 152 having a curved exterior surface is employed, an elastomeric pad having any desirable shape may be employed, including an elastomeric pad having a flat exterior surface, as the present disclosure is not so limited.

In some embodiments, the first fluorescent layer 202A and second fluorescent layer 202B may be configured emit different wavelengths of fluorescent light. If, for example, first fluorescent layer 202A fluoresces red (e.g., light having a wavelength between 635 nm and 700 nm) and second fluorescent layer 202B fluoresces green (e.g., light having a wavelength between 560 nm and 520 nm), then the flexible transparent structure 150 is filled with red light from one side and green light from the other side. The light sources 156 as shown in FIG. 4 illuminate an exterior surface of the fluorescent layers 202A, 202B. However, in other embodiments, the illumination of the first fluorescent layer 202A and second fluorescent layer may come from within the block. For example, one or more light sources may emit light toward an interior surface of the first fluorescent layer and second fluorescent layer. One embodiment including such an arrangement will be described further with reference to FIGS. 5-6.

According to the embodiment of FIG. 4, if the first fluorescent layer 202A fluoresces light in a first wavelength (e.g., red) under ultraviolet light and reflects lights in that first wavelength (e.g., appears red when viewed under visible light), the first fluorescent layer may serve a similar function as the filters described with reference to the embodiments of FIGS. 2 and 3. Furthermore, the fluorescent layer may also function as the diffuser described with reference to FIG. 3. In the embodiment of FIG. 4, the emitted fluorescent light is already diffuse due to the properties of fluorescent emission. In addition, the fluorescent layers prevent multiple reflections of the light within the block, meaning an additional filter may be redundant or otherwise not required. In a case where the second fluorescent layer 202B fluoresces light in a second wavelength (e.g., green) under ultraviolet light and also reflects lights in that second wavelength (e.g., appears green when viewed under visible light), the second fluorescent light will travel across the flexible transparent structure 150 until it strikes the first fluorescent layer 202A, at which point the second fluorescent light will be absorbed because the first fluorescent layer does not reflect light in the wavelength of the second fluorescent light. Likewise, the second fluorescent layer 202B would also absorb light emitted from the first fluorescent layer 202A, thereby reducing nuisance illumination caused by returning reflections from the side surfaces of the flexible transparent structure. Thus, the functions of diffusion and absorption are automatically provided by the fluorescent layers.

In some embodiments, the fluorescent layers may be configured to fluoresce in wavelengths corresponding to red and green visual colors. While it is possible to use fluorescent blue paint as well, some blue pigments are of low efficiency and low purity compared to those of red and green. Thus, in some embodiments, it may be preferable to supply light corresponding to the blue visual color (e.g., light having wavelengths between 490 and 450 nm) from one or more light sources (e.g., LEDs), and red and green light from fluorescent layers. Of course, any suitable arrangement of light sources and fluorescent layers may be employed to provide illumination in a retrographic sensor, as the present disclosure is not so limited.

According to exemplary embodiment described herein, ultraviolet light may be employed as the exciting source for fluorescence of one or more fluorescent layers. It will be understood that other wavelengths of light, including those in the blue or violet range (e.g., between 380 and 490 nm), may also be used to excite fluorescence in some embodiments. Indeed, fluorescence can often be induced by many wavelengths that are shorter than the emission wavelength, so the exciting wavelengths could be in a wide range of the visible spectrum (e.g., between 380 and 750 nm) Such visible lights may be used for fluorescent excitation if they do not interfere with the visibility of the information derived from the fluorescent emissions of the one or more fluorescent layers.

The embodiment of FIG. 4 employs a flexible transparent structure 150 having a rectangular prism (e.g., block) shape. Additionally, the at least partially reflective layer 160 is configured as a semi-specular layer to accommodate curvature of the flexible structure that may be introduced by bending. However, one or more fluorescent layers may also be employed with a transparent structure having a curved shape in a resting state. Additionally, one or more fluorescent layers may be employed with a matte layer, as the present disclosure is not so limited.

Figure 5:
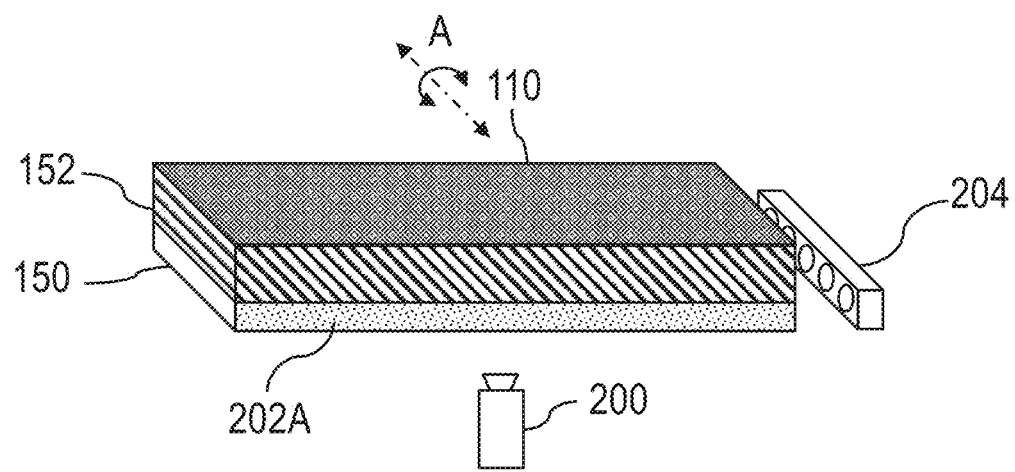
FIG. 5 is a perspective schematic of yet another embodiment of a retrographic sensor.
Figure 6:
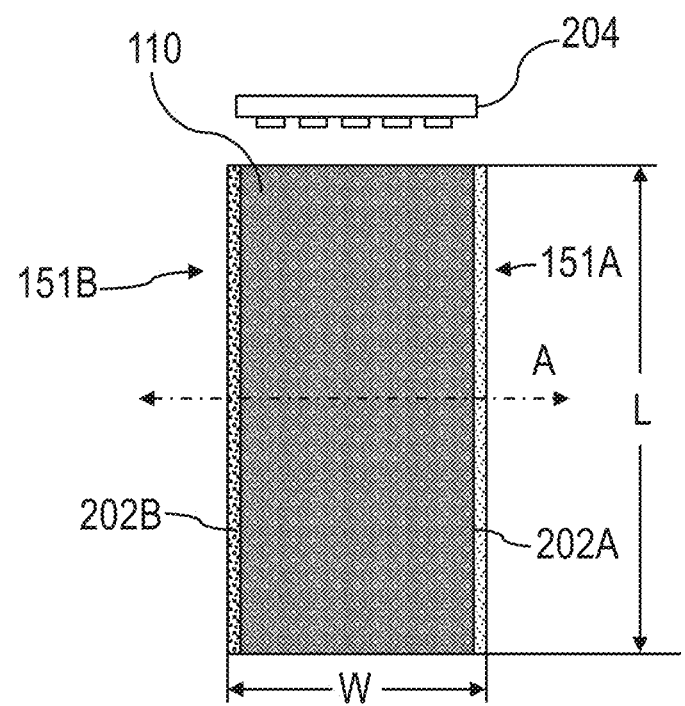
FIG. 6 is a top schematic of the retrographic sensor of FIG. 5.

FIG. 5 is a perspective schematic and FIG. 6 is a top schematic of yet another embodiment of a retrographic sensor. According to the embodiment of FIG. 5 and like the embodiment of FIG. 4, the retrographic sensors includes a first fluorescent layer 202A and a second fluorescent layer 202B disposed on a first side surface 151A and a second side surface 151B of a flexible transparent structure 150, respectively. The first side surface 151A and the second side surface 151B extend between an interior surface (e.g., facing a photosensitive detector 200) and exterior surface (e.g., facing away from the photosensitive detector 200) of the flexible transparent structure 150. The flexible transparent structure of FIGS. 5-6 is configured to elastically deform (e.g., bend) about a single axis A. As shown in FIG. 6, the length L of the flexible transparent structure is greater than the width W, which facilitates bending about the axis A while inhibiting bending about other axes. In other embodiments, the flexible transparent structure may be configured to bend about a different axis or multiple axes, as the present disclosure is not so limited. As shown in FIG. 5, the sensor includes an elastomeric pad disposed on an exterior surface of the flexible structure 150 including an at least partially reflective layer 110. The retrographic sensor includes a light source 204 having a plurality of individual LEDs arranged in an array. Of course, other lighting arrangements may be employed, as the present disclosure is not so limited. The light source 204 is configured to excite fluorescence from the first fluorescent layer 202A and the second fluorescent layer 202B to illuminate the elastomeric pad 152 and at least partially reflective layer 110. The light source may also function as an independent illumination source for the elastomeric pad.

As shown in FIG. 5, the retrographic sensor also includes a photosensitive detector 200 oriented towards an interior surface of the flexible transparent structure 150. The photosensitive detector is configured to receive light reflected from the at least partially reflective layer 110. The photosensitive detector may send images and/or other information to a processor for processing. According to the embodiment of FIGS. 5-6, the light source 204, first fluorescent layer 202A, and second fluorescent layer 202B each emit light into the transparent structure 150 in a different direction. In particular, the light from the light source 204, first fluorescent layer 202A, and second fluorescent layer 202B are emitted into the flexible transparent structure in perpendicular directions. In some embodiments, the light source 204, first fluorescent layer 202A, and second fluorescent layer 202B may each emit light having a different primary wavelength or substantially non-overlapping wavelength bands, such that the photosensitive detector may employ photometric stereo to characterize the surface of the elastomeric pad.

Figure 7:
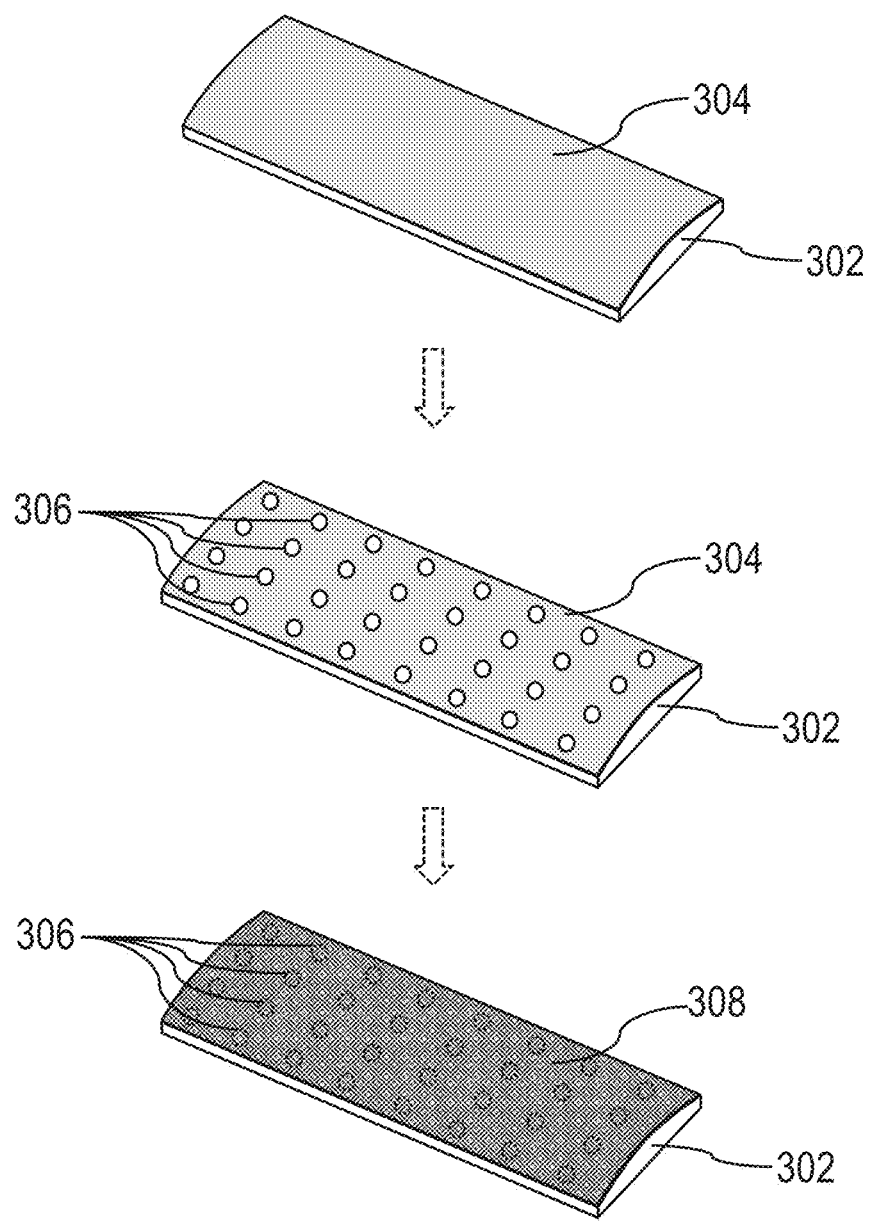
FIG. 7 depicts one embodiment of a process of forming an elastomeric pad for a retrographic sensor.

FIG. 7 depicts one embodiment of a process of forming an elastomeric pad 302 for a retrographic sensor, and in particular forming an elastomeric pad including a plurality of pad markers. As discussed above, the inventors have appreciated that it may be desirable to provide one or more pad markers on an elastomeric pad that may be tracked to estimate shear forces applied to the elastomeric pad. Such a tracking process will be described further with reference to FIGS. 13A-14. FIG, As shown in FIG. 7, the elastomeric pad 302 may be curved and may include an at least partially reflective layer 304. The at least partially reflective layer may be a semi-specular layer. The at least partially reflective layer may be painted on the elastomeric pad. Once the at least partially reflective layer is established on an exterior surface of the elastomeric pad, the plurality of markers 306 may be formed in the at least partially reflective layer by engraving or otherwise removing the at least partially reflective layer. As shown in FIG. 7, the plurality of pad markers may be arranged in an array. In the depicted embodiment, the makers are arranged in four rows and eight columns. Of course, any suitable number of pad markers may be employed in another embodiment, as the present disclosure is not so limited. As shown in FIG. 7, a dark (e.g., black) layer 308 is disposed overtop the pad markers 306 and at least partially reflective layer. As the at least partially reflective layer was removed to form the pad markers, the dark layer is visible from an interior surface of the elastomeric pad 302. Accordingly, a photosensitive detector may be able to distinguish the pad markers from the at least partially reflective layer due to the absence in reflectively from the dark layer 308. Once the elastomeric pad 302 is formed, it may be optically adhered to a flexible transparent structure to form part of a retrographic sensor assembly.

While in the embodiment of FIG. 7 the pad markers 306 are formed by removing portions of the at least partially reflective layer 304, in other embodiments the pad markers may be formed by adding material between the elastomeric pad 302 and the at least partially reflective layer. For example, the pad markers 306 may be painted on an exterior surface of the elastomeric pad prior to the at least partially reflective layer being painted on the exterior surface. Of course, the pad markers 306 may be formed using any suitable process, as the present disclosure is not so limited.

In a specific example of the process of FIG. 7, a platinum catalyst translucent silicone may be combined with a plasticizer to be used for the elastomeric pad 302 pad. The mixture may ensure a clear, transparent sensing region for the camera sensor and the plasticizer was added to increase the softness and robustness of the silicone pad. After degassing the silicone mixture and pouring it into a pre-prepared mold, the mold may be left to cure for 24 hours at room temperature. Once the elastomeric pad was cured, a thin layer of silicone paint may be brushed on the curved side of the silicone (e.g., with a foam brush). This paint layer may form a semi-specular tactile sensing surface. To create this surface, which would allow the sensor to more easily pick up small details and dimmer illumination in the tactile sensing surface, a mixture of silicone ink catalyst, gray silicone ink base, 4 μm Aluminum cornflakes, and NOVOCS Gloss may be used. After allowing the painted surface to fully cure, 1 mm circular dots spaced 4 mm apart may be laser engraved on the painted surface, effectively removing the painted layer. A layer of black silicone paint may be sprayed on using an airbrush, creating patterned black dots on the silver-gray tactile surface.

Figure 8A:
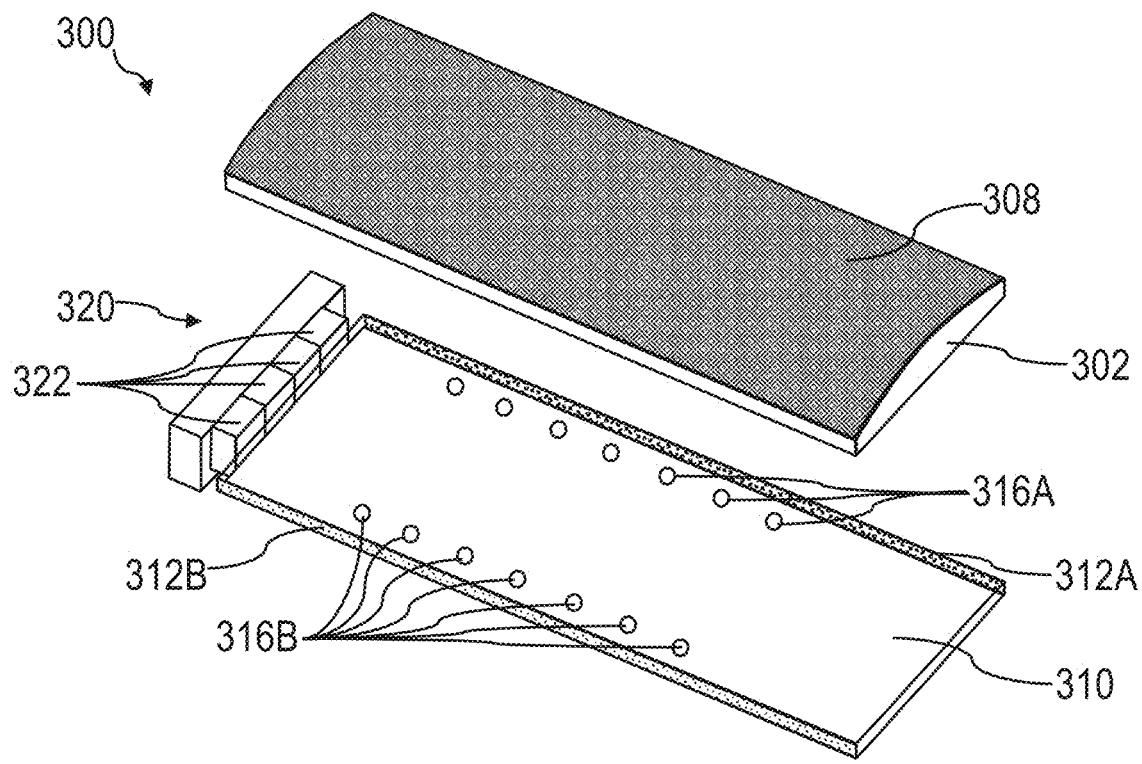
FIG. 8A depicts an exploded view of yet another embodiment of a retrographic sensor.
Figure 8B:
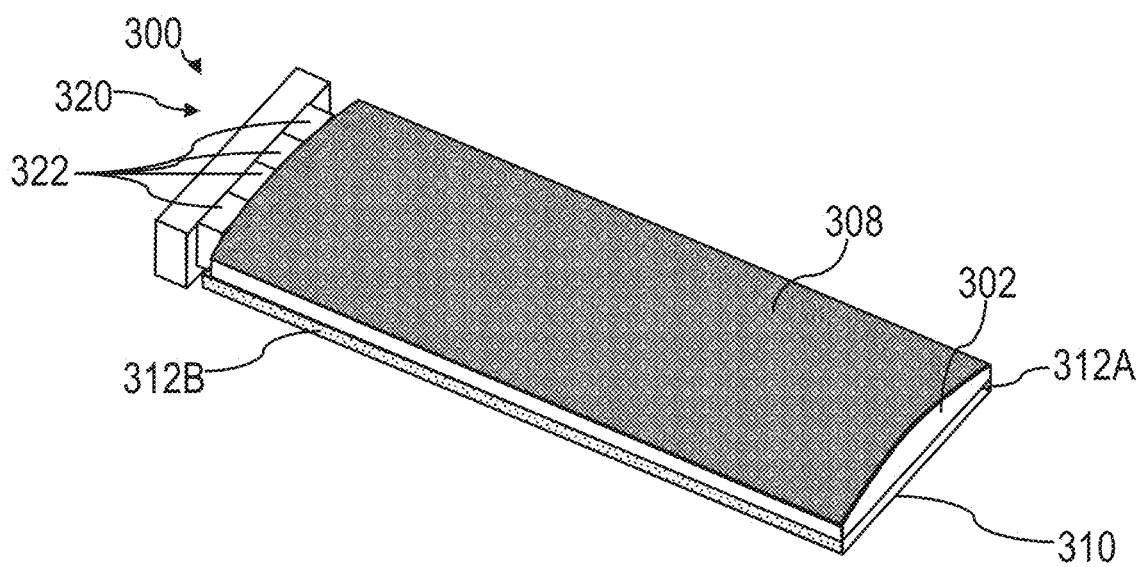
FIG. 8B depicts an assembled view of the retrographic sensor of FIG. 8A.

FIG. 8A depicts an exploded view and FIG. 8B depicts an assembled view of yet another embodiment of a retrographic sensor 300. As shown in FIGS. 8A-8B, the elastomeric pad 302 of FIG. 7 is employed. The retrographic sensor 300 includes a flexible transparent structure 310 that is configured to bend about a single axis or multiple axes depending on the embodiment. The retrographic sensor also includes a first fluorescent layer 312A disposed on a first side surface and a second fluorescent layer 312B disposed on a second side surface. In other embodiments, other types of light sources may be employed instead of fluorescent layers, as the present disclosure is not so limited. As shown in FIGS. 8A08B, the retrographic sensor also includes a light source 320 including a plurality of LEDs 322 configured to illuminate the structure 310 and the first and second fluorescent layers. The light source 320 may be configured to excite fluorescence from the fluorescent layers to illuminate the elastomeric pad 302.

In the embodiment of FIGS. 8A-8B, the flexible transparent structure may be formed of approximately 0.5 mm thick acrylic. Of course, any suitable thickness of acrylic may be employed, as the present disclosure is not so limited. The thinness of the acrylic ensures that the structure has overall compliance and can bend when it comes into contact with an object. Acrylic also has a reasonably close optical index match with silicone, which helps to mitigate light interference of the sensing surface caused by refraction. Of course, any suitably flexible optically transparent material for the flexible transparent structure may be employed, as the present disclosure is not so limited.

As shown in FIG. 8A, the flexible transparent structure 310 includes a plurality of markers 316A/316B. In particular, the plurality of markers is arranged in two groups corresponding to a first plurality of markers 316A and a second plurality of markers 316B which are arranged in separate rows located on opposing sides of a longitudinal axis of the flexible transparent structure 310 extending along a length of the structure. The plurality of markers may function as fiducial markers for the configuration of the flexible transparent structure. That is, as the flexible transparent structure bends, the positions of the plurality of markers will change as observed by a photosensitive detector. These position changes may be used to determine the configuration of the flexible transparent structure. Once the configuration is determined, a reference frame may be established from which changes in light reflection from the elastomeric pad 302 may be observed and used to reconstruct a three-dimensional surface of an object in contact with the elastomeric pad 302. Such a process will be discussed further with reference to FIGS. 10-12. In some embodiments the plurality of markers may be formed by fluorescent paint. In some embodiments, the plurality of makers may be configured to emit yellow light. Such a color may be more readily visible to a photosensitive detector under dim illumination conditions without interfering with colors employed for tactile sensing. Of course, the plurality of markers may not be fluorescent, or may emit or reflect any suitable color, as the present disclosure is not so limited.

Figure 9A:
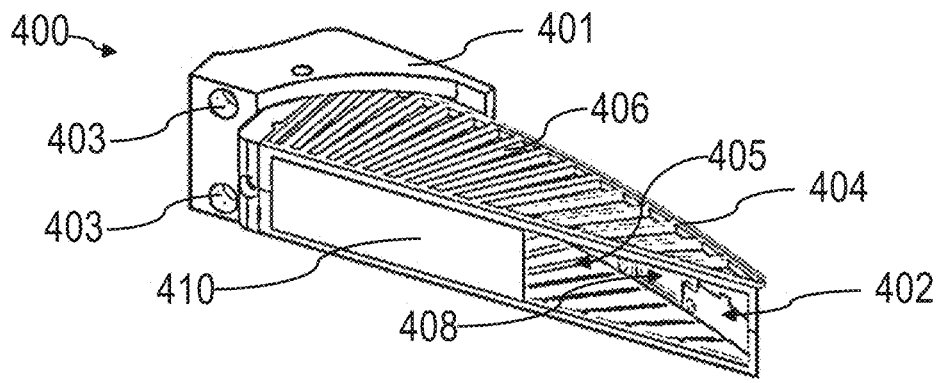
FIG. 9A depicts a perspective view of one embodiment of a robotic gripper.

FIG. 9A depicts a perspective view of one embodiment of a robotic gripper 400. As shown in FIG. 9A, the robotic gripper includes a base 401 which may be mounted to a robotic system (e.g., a robotic arm). The base includes fastening holes 403 which may receive fasteners to facilitate the mounting of the gripper on the robotic system. As shown in FIG. 9A, the gripper also includes a chassis 404 which is configured to allow the gripper to bend about a single axis. The chassis includes a plurality of struts 406 which resist bending of the gripper in direction other than the desired bending direction. In particular, the chassis 404 is arranged as a A-frame structure with the struts 406 interconnecting the two sides of the "A". Such an arrangement allows the chassis to bend along a single axis when force is applied to the chassis. The chassis 404 also includes a contact receptacle 402 which is configured to receive a contact such as a flexible retrographic sensor according to exemplary embodiments described herein. The chassis also includes a photosensitive detector receptacle 408 configured to receive and mount a photosensitive detector as part of the flexible retrographic sensor. The chassis also includes an internal volume 405 configured to accommodate retrographic sensor. The internal volume is shielded from external light by a flexible light blocking material 410 which is configured to flex with the gripper. In some embodiments, the flexible light blocking material may be formed of elastic cloth (e.g., a mixture of spandex and nylon or spandex and cotton) or other appropriate elastic opaque material. The light blocking material may be adhered to an interior surface of the struts 406 to block light entering the gaps between the struts.

Figure 9B:
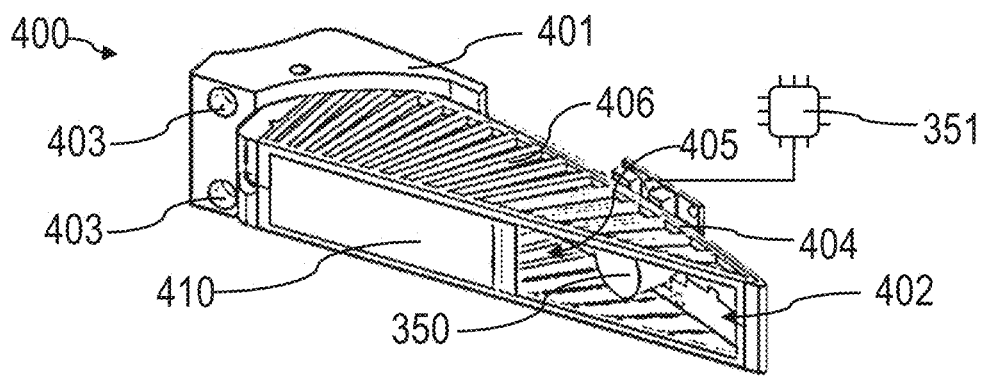
FIG. 9B depicts the robotic gripper of FIG. 9A and a photosensitive detector of a retrographic sensor.

FIG. 9B depicts the robotic gripper of FIG. 9A and a photosensitive detector 350. As shown in FIG. 9B, the photosensitive detector is received and retained in the receptacle 408 shown in FIG. 9A. The photosensitive detector is oriented toward the contact receptacle 402. Accordingly, the photosensitive detector will be oriented toward, or otherwise optically coupled with, an interior surface of a flexible transparent structure of a retrographic sensor employed as a contact. The light blocking material 410 inhibits external light from reaching the photosensitive detector. In some embodiments, the photosensitive detector may include a yellow filter to mitigate the saturation of blue LEDs viewed by the camera. Such an arrangement helps make the red and green colors from light sources, which may not be as vivid or bright, visible by the camera. In some embodiments as shown in FIG. 9B, the photosensitive detector 350 is connected to a processor 351. The processor may be configured to receive data from the photosensitive detector (e.g., an image) and process that data according to exemplary methods and processes described herein. In some embodiments, the processor may be located on the gripper 400, or may be disposed remotely or on another portion of a robotic system.

Figure 9C:
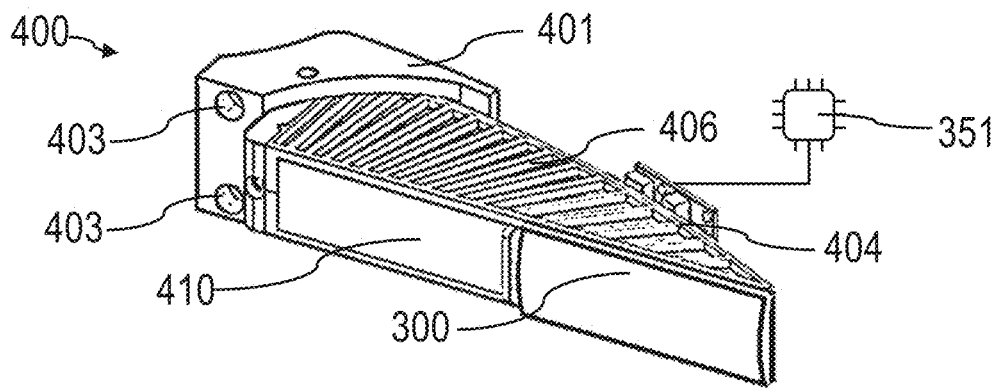
FIG. 9C depicts the robotic gripper and photosensitive detector of FIG. 9B, as well as a flexible portion of a retrographic sensor.

FIG. 9C depicts the robotic gripper and photosensitive detector of FIG. 9B, as well as a retrographic sensor 300. As shown in FIG. 9C, the retrographic sensor 300 is received in the contact receptacle and forms a gripping surface for the gripper. The retrographic sensor 300 may have an arrangement like that shown and described with reference to FIGS. 8A-8B and/or any other embodiment described herein. The retrographic sensor may be configured to be flexible and bend along the same axis as the gripper 400. Accordingly, the retrographic sensor may not adversely impact the compliance of the gripper.

Figure 10:
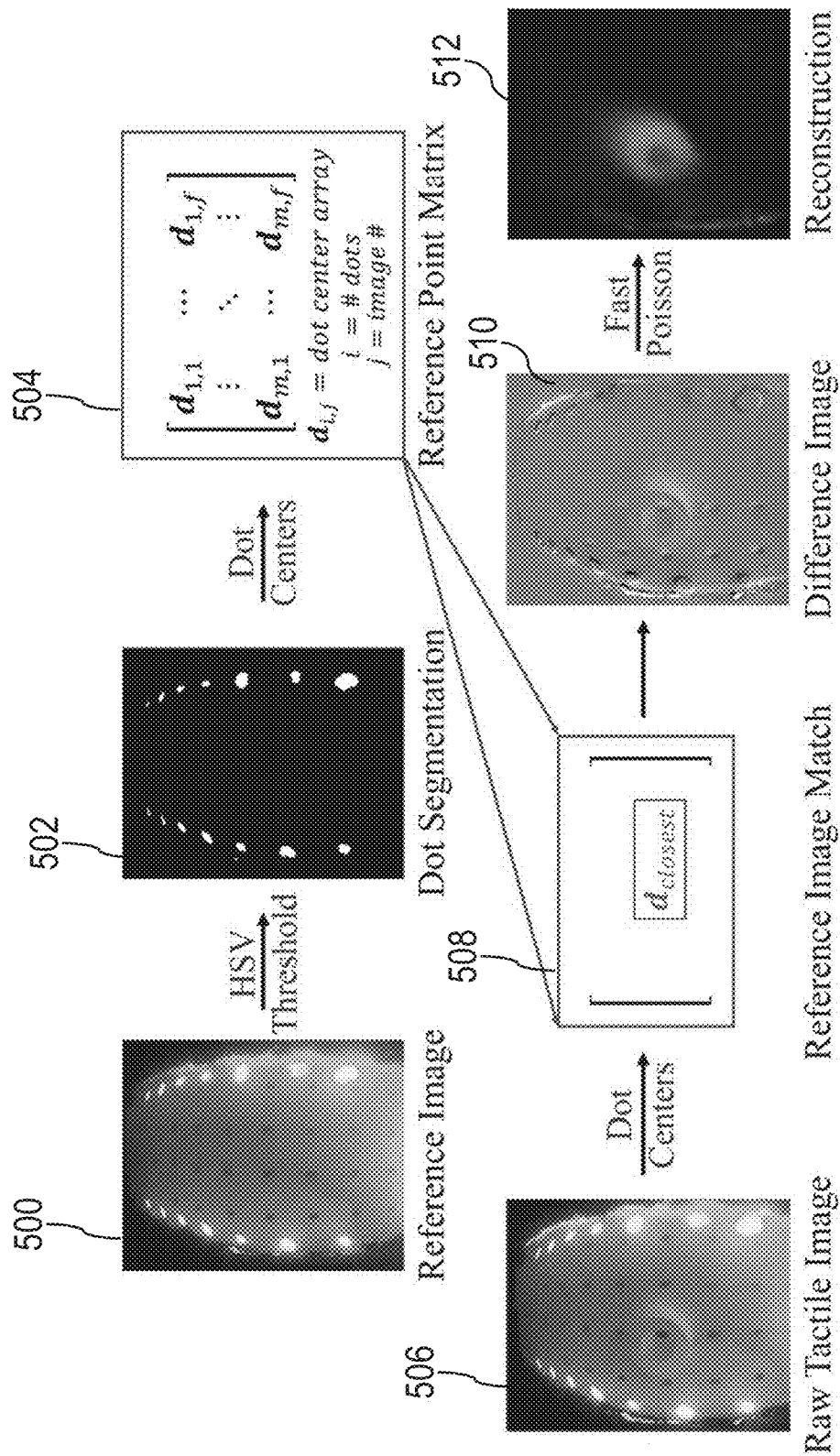
FIG. 10 depicts one embodiment of a process of tactile reconstruction.

FIG. 10 depicts one embodiment of a process of tactile reconstruction. As discussed previously, the inventors have recognized that challenge with incorporating tactile sensing into a soft gripper is that the retrographic sensor deforms when any object comes in contact with it. As a result, a photosensitive detector sees both the proprioceptive change when the finger bends, and the minute changes in the silicone pad corresponding to the tactile surface interactions. Tracking the fine-detailed tactile information employs knowledge of the proprioceptive state of the finger or the bending positions of a flexible transparent structure. Accordingly, as discussed with reference to previously embodiments, one or more reference markers may be disposed on the flexible transparent structure so that motion of the flexible transparent structure can be tracked and used as a reference. FIG. 10 depicts a process of establishing references based on the markers and employing those references to reconstruct a three-dimensional surface of an object. The process shown in FIG. 10 may be performed by a processor (e.g., a processor of the retrographic sensor).

As shown in block 500, a plurality of reference images may be obtained for a retrographic sensor. The retrographic sensor may be elastically deformed through a range of motion as the images are obtained (e.g., by a photosensitive detector). In some embodiments, a video of the retrographic sensor may be taken as the retrographic sensor is moving through a range of configurations. As shown in block 502, an HSV threshold (e.g., a contour finding algorithm) and dot segmentation may be applied to obtain dot centers, which correspond to the relative positions of the markers of the transparent layer. As shown in block 504, these positions may be stored as reference positions in a sparse matrix. The matrix may effectively represent the changes in marker position for each of the various configurations that may be adopted by the retrographic sensor via elastic deformation. For each configuration, an image or other data related to the retrographic sensor may also be stored. Of course, while specific techniques are shown in FIG. 10, any suitable processing may be employed to obtain reference data for the markers of a flexible transparent structure, as the present disclosure is not so limited.

As shown in block 506 of FIG. 10, a subsequent image from the retrographic sensor may be obtained. This image may be representative of an image taken while an object is being grasped. Accordingly, the image will reflect both a particular configuration of the retrographic sensor, as well as the tactile information from the object caused by deformation in an elastomeric pad. As shown in block 508 the positions of the markers of the transparent structure may be obtained (e.g., via a contour finding algorithm, machine learning, etc.). As shown in block 508, the closest reference match is determined, for example, by minimizing the difference between the marker positions from the reference and the marker positions from the raw image. Based on the matching reference configuration, a reference image may be obtained as shown in block 510. The reference image may be employed to produce a difference image between the raw image and the reference image for a particular configuration. The difference image may be representative of contact with an external object. In block 512, a fast Poisson or another suitable algorithm may be employed to reconstruct the three-dimensional profile of the object in contact with the retrographic sensor. In this manner, the retrographic sensor can determine its configuration and provide tactile information regarding an object.

Figure 11:
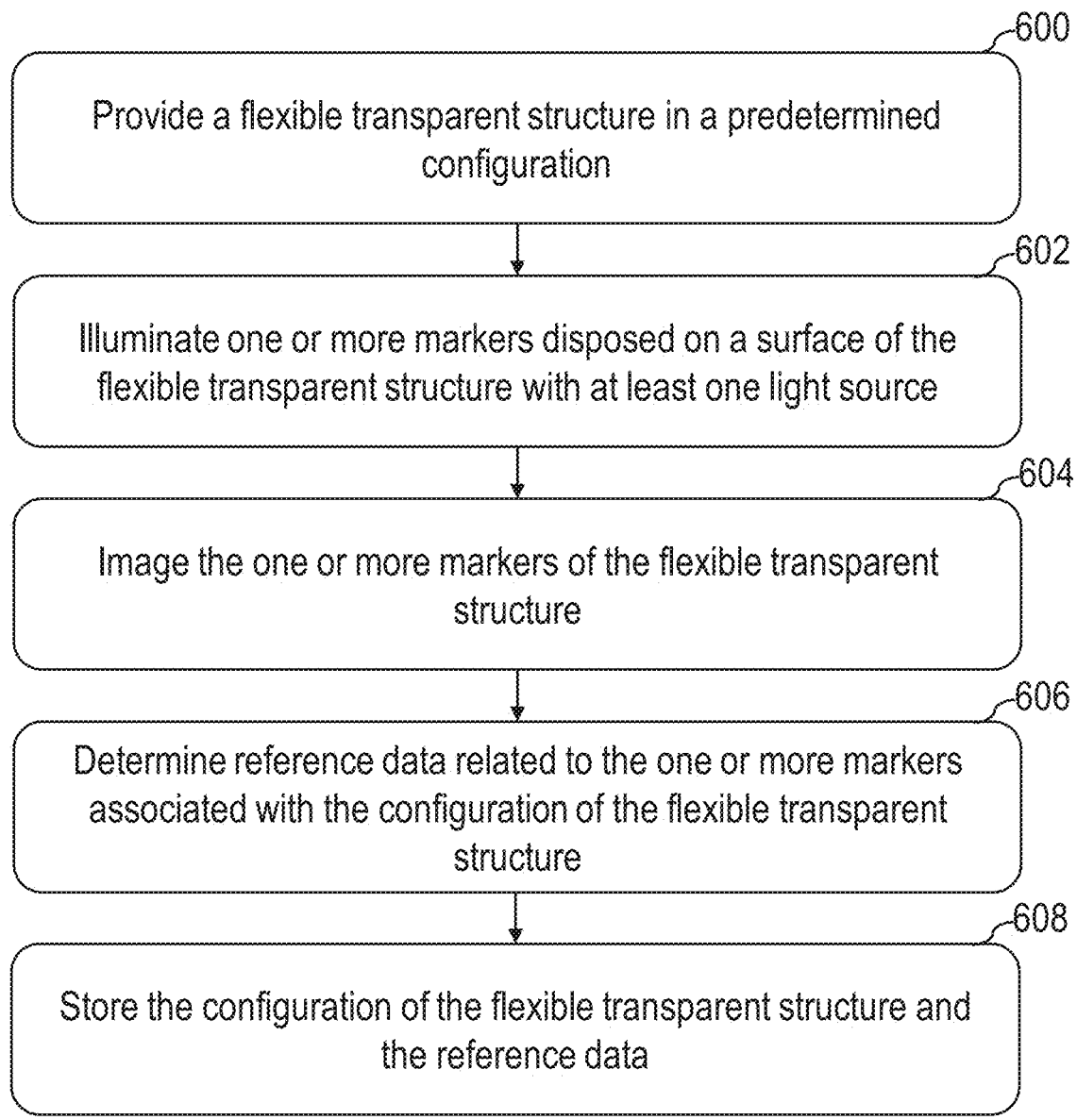
FIG. 11 depicts a flow chart for one embodiment of a method of calibrating a retrographic sensor according to exemplary embodiments described herein.

FIG. 11 depicts a flow chart for one embodiment of a method of calibrating a retrographic sensor according to exemplary embodiments described herein. The depicted method may be implemented by one or more processors associated with any of the embodiments of a retrographic sensor disclosed herein using processor executable instructions stored on associated non-transitory computer readable memory. As shown in block 600, a flexible transparent structure is provided in a predetermined configuration. The flexible transparent structure may be part of a retrographic sensor functioning as a contact for a robotic gripper. In block 602, one or more markers disposed on the surface of the flexible transparent structure may be illuminated with at least one light source. The light source may include active light sources such as LEDs, or fluorescent light sources such as fluorescent paint layers, as described herein. In some embodiments, the one or more markers may fluoresce under light from the at least one light source. In block 604, the one or more markers may be imaged. According to such an embodiment, the image may be processed (by the retrographic sensor or a remote processor). In block 606, reference data related to the one or more makers associated with the configuration of the flexible transparent structure may be determined. For example, in some embodiments the reference data may include marker positions, spacings between markers, images, and/or another suitable form of data related to the imaged markers that may be employed to later identify a configuration of the transparent structure. In some embodiments, the reference data may be determined by processing the image obtained in block 604 using one or more algorithms. In some embodiments, the reference data may be the image obtained in block 604. In some embodiments, the reference data may include both the image obtained in block 604 and the outputs of further processing that image. Of course, any suitable reference data may be employed, as the present disclosure is not so limited. In block 608, the configuration of the flexible transparent structure and reference data related to the one or more markers associated with the configuration of the flexible transparent structure may be stored (e.g., in non-volatile computer memory in cloud storage, in a database, etc.). In some embodiments, the reference data may include an image of the flexible transparent structure. The stored configuration and reference data may be employed to correct for changes in configuration of a retrographic sensor in subsequent images. In some embodiments, the method of FIG. 11 may be repeated to obtain and store configurations and reference data corresponding to those configurations for a range of motion of a retrographic sensor included in a robotic gripper or other system such that a set of reference data and/or images associated with a plurality of configurations of the sensor.

Figure 12:
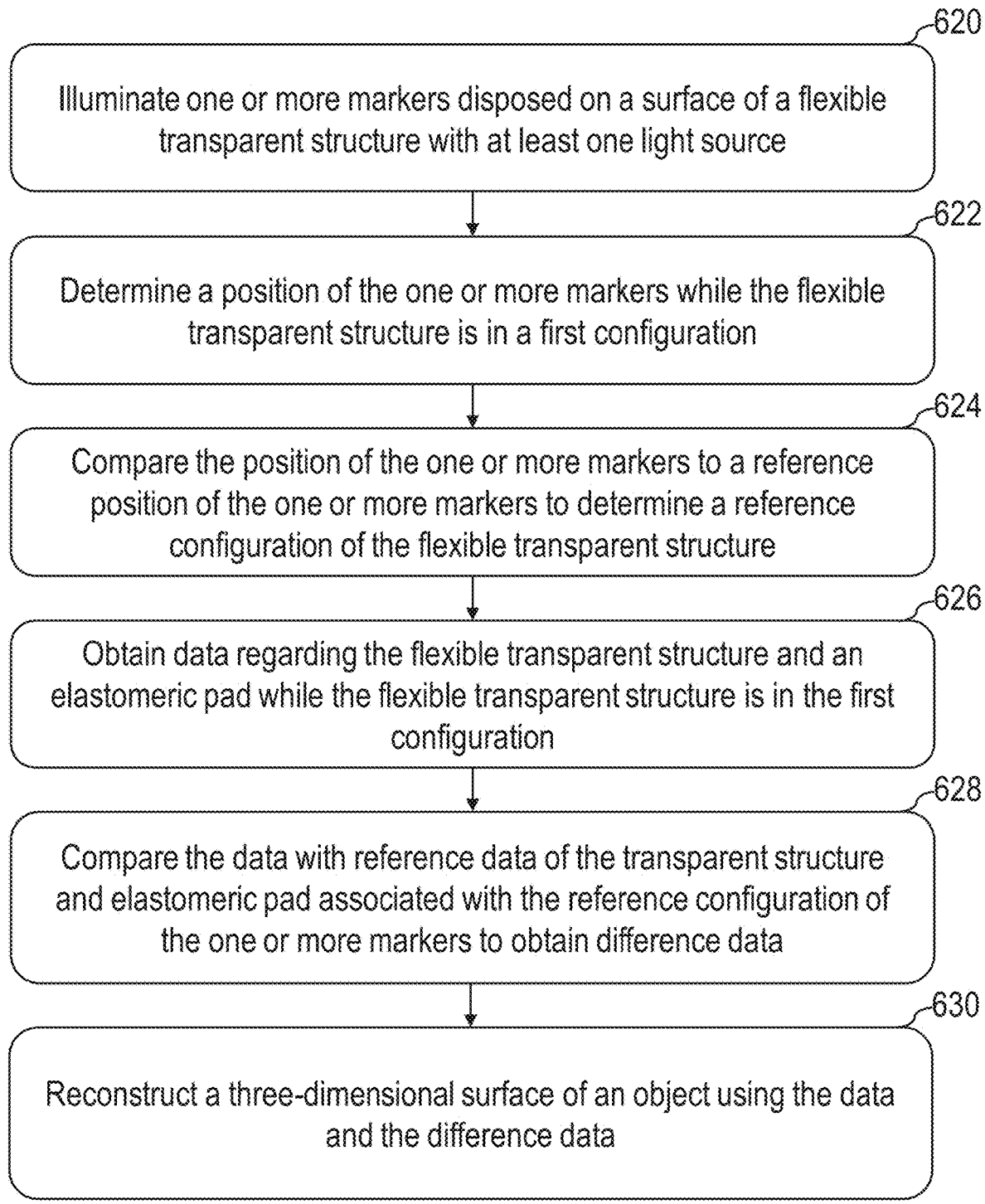
FIG. 12 depicts a flow chart for one embodiment of a method of tactile reconstruction.

FIG. 12 depicts a flow chart for one embodiment of a method of tactile reconstruction. The depicted method may be implemented by one or more processors associated with any of the embodiments of a retrographic sensor disclosed herein using processor executable instructions stored on associated non-transitory computer readable memory. In block 620, one or more markers disposed on a surface of a flexible transparent structure are illuminated with a light source. The light source may include active light sources such as LEDs, or fluorescent light sources such as fluorescent paint layers, as described herein. In block 622, a position of the one or more markers is determined while the transparent structure is in a first configuration. For example, in some embodiments the position may be extracted from an image taken of the transparent structure. In block 624, the position of the one or more markers is compared to a reference position of the one or more markers to determine a reference configuration of the flexible transparent structure. For example, a nearest neighbor lookup may be applied to determine the reference configuration with the closest marker reference position to the determined position. Thus, a reference configuration closest to the actual configuration of the flexible transparent structure may be determined. In block 626, data may be obtained regarding the flexible transparent structure and an elastomeric pad while the flexible transparent structure is in the first configuration. The data may include an image obtained from a photosensitive detector, in some embodiments. In some embodiments, the data may be real-time data obtained from a photosensitive detector of a retrographic sensor. In block 628, the data may be compared with reference data associated with the determined reference configuration of the substrate to obtain difference data. For example, the reference data may include a reference image of the undeformed illuminated elastomeric pad when the flexible transparent structure is in the determined reference configuration. Correspondingly, in some embodiments, the difference data may be a difference image corresponding to a difference between an image of the elastomeric pad of the sensor in the current configuration and an image of the elastomeric pad of the sensor in the determined reference configuration. In block 630, the data and difference data are employed to reconstruct a three-dimensional surface of an object being grasped by the retrographic sensor including the flexible transparent structure. The object may be in contact with an elastomeric pad of the retrographic sensor.

Figure 13A:
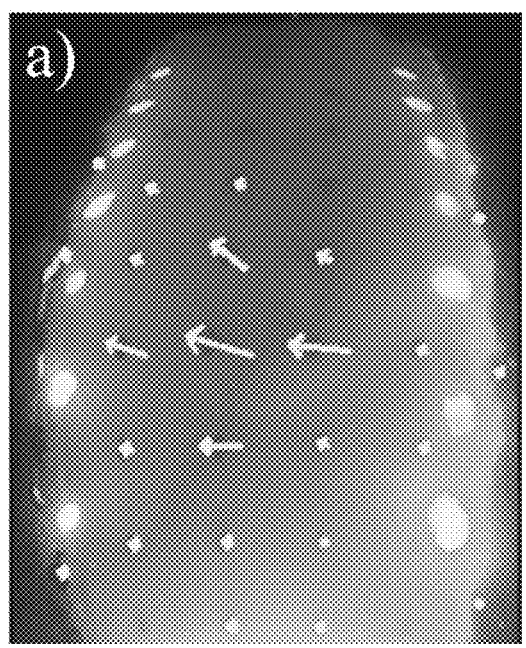
FIG. 13A depicts one embodiment of marker tracking in an elastomeric structure of a retrographic sensor.

FIG. 13A depicts one embodiment of marker tracking in an elastomeric structure of a retrographic sensor. As discussed previously, an elastomeric pad may include one or more pad markers. The one or more pad markers may move in response to shear forces applied to the elastomeric pad. FIG. 13A depicts the results of such a movement because of shear forces. In particular, FIG. 13A depicts arrows showing the direction of movement of pad markers relative to a reference position of the pad markers (e.g., in an unstressed state). The change in position of the pad markers may be determined relative to a reference image corresponding to a reference configuration matching that or close to the actual configuration of the retrographic sensor. The method to produce the output shown in FIG. 13A is discussed further with reference to FIG. 14.

Figure 13B:
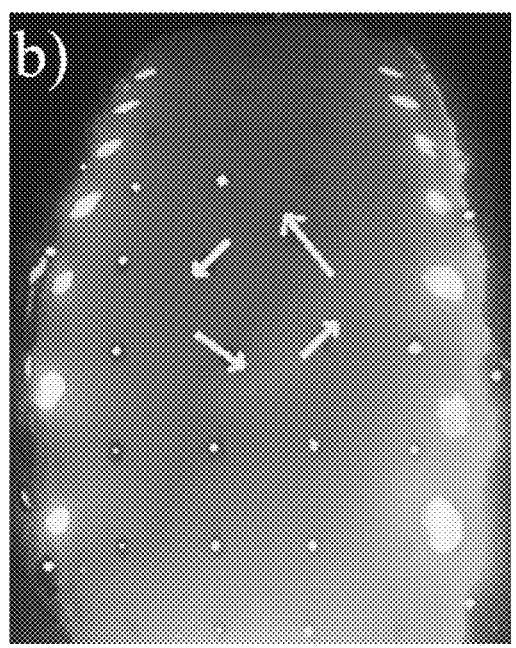
FIG. 13B depicts another embodiment of marker tracking in an elastomeric structure of a retrographic sensor.

FIG. 13B depicts another embodiment of marker tracking in an elastomeric structure of a retrographic sensor. As shown in FIG. 13B, a retrographic sensor according to exemplary embodiments described herein may be able to determine shear forces in any direction parallel to the surface of the elastomeric pad. Accordingly, as shown in FIG. 13B, torsional forces may also be determined by the retrographic sensor based on a comparison of the positions of the pad markers to reference position of the pad markers.

Figure 14:
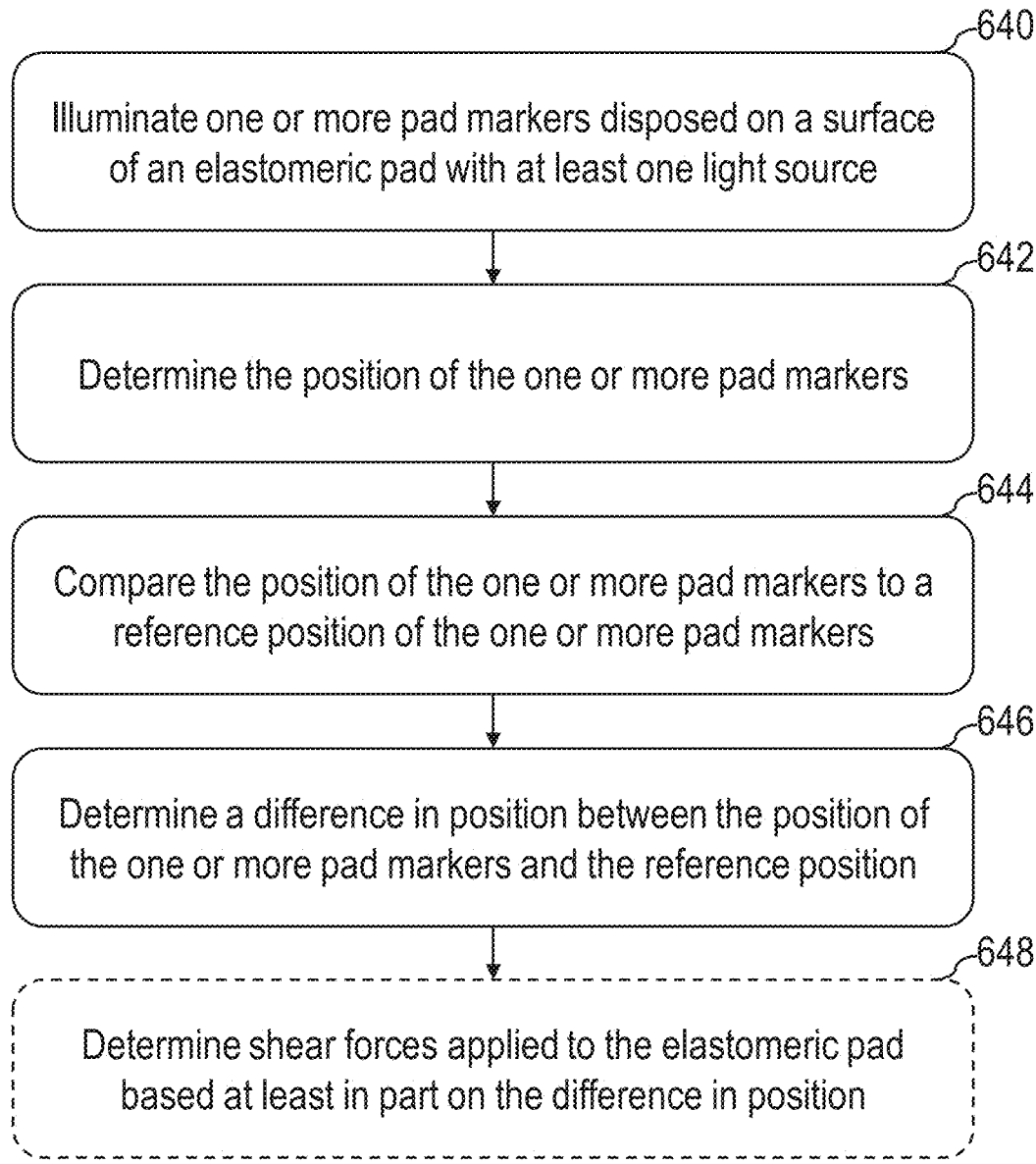
FIG. 14 depicts a flow chart for one embodiment of a method of marker tracking in an elastomeric structure.

FIG. 14 depicts a flow chart for one embodiment of a method of marker tracking in an elastomeric structure. The depicted method may be implemented by one or more processors associated with any of the embodiments of a retrographic sensor disclosed herein using processor executable instructions stored on associated non-transitory computer readable memory. In block 640, one or more pad markers disposed on a surface of an elastomeric pad are illuminated with a light source, which may include active lights sources and/or fluorescent light sources. In block 642, the position of the one or more markers is determined. For example, in some embodiments an image of the elastomeric pad may be obtained (e.g., from a photosensitive detector) and processed to obtain the position. For example, machine learning, contour algorithms, or other processing techniques may be employed. In block 644, the position of the one or more markers may be compared to a reference position of the one or more pad markers. In some embodiments, the reference position of the one or more pad markers may be based on a determined configuration of the retrographic sensor (for example, see FIGS. 10-12). In block 646, a difference in position between the position of the one or more pad markers and the reference position is determined. This difference in position may correspond to a vector showing magnitude and direction of shear forces applied to the elastomeric pad. In optional block 648, shear forces applied to the elastomeric pad may be determined based at least in part on the difference in position determine in block 646. In some embodiments, the difference in position may be rendered to a user in a graphical representation, for example, as shown in FIGS. 13A-13B.

Example: Experimental Embodiment

To test the compliance and gripping ability of the retrographic sensor described herein, many test objects were handed to the gripper shown and described with reference to FIG. 9C to be grasped. These objects included a mini screwdriver, a plastic strawberry, a plastic lemon, a plastic orange, a Rubik's cube, a wine glass, a ball glass mason jar, and a deformable, squishy acrylic paint tube.

To test the orientation estimation and marker tracking, the gripper was programmed to be handed a wine glass stem, measure its orientation based on tactile results, and rotate the gripper so that the wine glass would be oriented upright. Afterwards, the gripper would set the wine glass down until the total magnitude, or shear force, detected by the marker tracking algorithm exceeded a threshold, indicating that the glass had touched the table. A wine glass was chosen because it is difficult to segment transparent objects using vision, and thus, tactile sensing greatly simplified the reorientation and placement problem The gripper of FIG. 9C was able to comply to and grasp all of the test objects, which included a variety of different sizes and shapes. For curved objects, the gripper of FIG. 9C was able to wrap around the curvature of the grasped objects while for the more linear objects, such as the screwdriver and the Rubik's cube, the fingers acted more like a rigid, parallel gripper. For the squishy paint tube, the gripper was able to comply around the object without breaking or collapsing the paint tube. Although the grips for heavy and asymmetrically weighted objects were subject to slippage, the grasp became sturdier once the force the gripper could apply was increased.

In summary, the gripper was able to grasp a multitude of objects, showcasing that the fingers still retain their compliance properties, which makes them useful for a large variety of grasping tasks that potentially need robust, universal grasping abilities combined with tactile sensing. The tactile surface of the sensor was able to detect minute details, such as some of the threads of a M2.5 screw, and the indents on the outside of a M4 heated insert. All the reference images were able to help provide good reconstruction images.

Without tactile sensing, the task of reorienting and setting down a wine glass without tipping it over or crashing it into the table becomes more complex due to its transparency, which makes it harder to see. With the gripper described herein, however, wine glass reorientation was generally successful. Out of the 10 trials that were performed, the algorithm was able to succeed in seven of them; the gripper was able to allow the gripper to successfully reorient and set the wine glass down without it tipping over. In the three cases where the algorithm failed, the grasp was not secure enough and the wine glass slightly slipped out of the griper grasp, causing the reconstruction of the image to fail, which in turn caused failure of the reorientation portion of the wine glass. However, in those cases, the gripper was still able to detect when the wine glass came in contact with the table and stop itself from crashing the wine glass into the table further and potentially breaking it.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively, or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A retrographic sensor comprising:
a flexible transparent structure including an interior surface, an exterior surface, and one or more side surfaces extending between the interior surface and the exterior surface, wherein the flexible transparent structure is configured to elastically deform about at least one axis;
a transparent elastomeric pad disposed on the exterior surface of the flexible transparent structure;
an at least partially reflective layer disposed on the transparent elastomeric pad such that the transparent elastomeric pad is disposed between the at least partially reflective layer and the flexible transparent structure; and
at least one light source disposed adjacent at least a first side surface of the one or more side surfaces, wherein the at least one light source is configured to emit light into the flexible transparent structure.

2. The retrographic sensor of claim 1, wherein the at least one light source is a plurality of light sources, wherein the one or more side surfaces are a plurality of side surfaces, wherein the plurality of light sources is disposed adjacent multiple different side surfaces of the plurality of side surfaces, and wherein the plurality of light sources is configured to emit at least two substantially non-overlapping wavelength bands into the multiple different side surfaces.

3. The retrographic sensor of claim 1, further comprising a first fluorescent layer disposed on at least a second side surface of the one or more side surfaces, wherein the first fluorescent layer is configured to emit first fluorescent light into the flexible transparent structure when illuminated by the at least one light source.

4. The retrographic sensor of claim 1, wherein the at least partially reflective layer is a semi-specular layer.

5. The retrographic sensor of claim 1, wherein the at least partially reflective layer is a matte layer.

6. The retrographic sensor of claim 1, further comprising a photosensitive detector oriented toward the interior surface of the flexible transparent structure.

7. The retrographic sensor of claim 6, further comprising:
one or more markers disposed on at least one of the exterior surface and the interior surface; and
a processor configured to:
illuminate the one or more markers with the at least one light source;
image the flexible transparent structure to obtain a first image;
determine a configuration of the flexible transparent structure based at least in part on the first image and reference data related to the one or more markers;
obtain a reference image associated with the configuration of the flexible transparent structure; and
obtaining a corrected image by comparing the first image with the reference image.

8. The retrographic sensor of claim 1, wherein the flexible transparent structure is configured to bend about a single axis.

9. A method of operating a retrographic sensor, comprising:
illuminating one or more markers disposed on a surface of a flexible transparent structure with at least one light source;
imaging the flexible transparent structure to obtain a first image;
determining a configuration of the flexible transparent structure based at least in part on the first image and reference data related to the one or more markers;
obtaining a reference image associated with the configuration of the flexible transparent structure;
obtaining a corrected image by comparing the first image with the reference image;
emitting light toward a transparent elastomeric pad disposed on an exterior surface of the flexible transparent structure; and
reflecting the light off of an exterior surface of the transparent elastomeric pad toward an interior surface of the flexible transparent structure.

10. The method of claim 9, wherein the reference data includes one or more reference positions of the one or more markers, and wherein obtaining the reference image comprises identifying a reference configuration corresponding to the configuration by comparing one or more positions of the one or more markers to the one or more reference positions.

11. The method of claim 9, further comprising emitting a first fluorescent light into the flexible transparent structure from a first fluorescent layer disposed on a first side surface of the flexible transparent structure.

12. The method of claim 9, further comprising determining three-dimensional surface information of an object in contact with the exterior surface of the transparent elastomeric pad.

13. The method of claim 9, wherein the reference data includes one or more reference positions of the one or more markers, wherein determining the configuration of the flexible transparent structure comprises determining the one or more reference positions that are closest matching to one or more positions of the one or more markers.

14. The method of claim 9, further comprising elastically deforming the flexible transparent structure from a first configuration to a second configuration.

15. The method of claim 14, wherein elastically deforming the flexible transparent structure comprises bending the flexible transparent structure about a single axis.

16. A flexible gripper comprising:
a chassis configured to elastically deform about at least one axis, the chassis including an object engaging portion; and
a retrographic sensor disposed in the object engaging portion, the retrographic sensor comprising:
a flexible transparent structure including an interior surface, an exterior surface, and one or more side surfaces extending between the interior surface and the exterior surface, wherein the flexible transparent structure is configured to elastically deform about the at least one axis,
a transparent elastomeric pad disposed on the exterior surface of the flexible transparent structure,
an at least partially reflective layer disposed on the transparent elastomeric pad such that the transparent elastomeric pad is disposed between the at least partially reflective layer and the flexible transparent structure,
at least one light source disposed adjacent at least a first side surface of the one or more side surfaces, wherein the at least one light source is configured to emit light into the flexible transparent structure, and
a photosensitive detector oriented toward the interior surface of the flexible transparent structure.

17. The flexible gripper of claim 16, wherein the at least one light source is a plurality of light sources, wherein the one or more side surfaces are a plurality of side surfaces, wherein the plurality of light sources is disposed adjacent multiple different side surfaces of the plurality of side surfaces, and wherein the plurality of light sources is configured to emit at least two substantially non-overlapping wavelength bands into the multiple different side surfaces.

18. The flexible gripper of claim 16, wherein the at least one axis is a single axis.

19. The flexible gripper of claim 16, further comprising a flexible light shield disposed on the chassis, where the flexible light shield is configured to inhibit external light from entering the flexible transparent structure.

* * * * *